United States Patent
Gohda et al.

[11] Patent Number: 5,835,666
[45] Date of Patent: Nov. 10, 1998

[54] REPRODUCING APPARATUS INCLUDING EQUALIZING MEANS WHICH EQUALIZES A REPRODUCED SIGNAL WHEN THE SIGNAL IS BETWEEN A FIRST AND SECOND LEVEL AND VARIES THE RESPONSE SPEED

[75] Inventors: Makoto Gohda, Tokyo; Yoshiyuki Sasaki, Kanagawa-ken, both of Japan

[73] Assignee: Canon Kabushiki Kaisha, Tokyo, Japan

[21] Appl. No.: 898,797

[22] Filed: Jul. 23, 1997

Related U.S. Application Data

[63] Continuation of Ser. No. 527,856, Sep. 14, 1995, abandoned.

[30] Foreign Application Priority Data

Sep. 22, 1994 [JP] Japan .................................. 6-227968
Oct. 4, 1994 [JP] Japan .................................. 6-240038

[51] Int. Cl.⁶ .......................... G11B 5/035; H04N 5/95; H04N 5/923; H04N 5/931
[52] U.S. Cl. ........................ 386/85; 386/93; 386/113; 360/65
[58] Field of Search ..................... 360/65, 36.1, 36.2; 386/2, 3, 9, 12, 13, 40, 113, 85, 90, 93, 114, 116, 46; 348/571, 607, 616–7

[56] References Cited

U.S. PATENT DOCUMENTS

| | | | |
|---|---|---|---|
| 5,050,002 | 9/1991 | Suzuki et al. | 358/336 |
| 5,274,512 | 12/1993 | Tanaka et al. | 360/65 |
| 5,276,517 | 1/1994 | Matsuzawa et al. | 358/174 |
| 5,287,385 | 2/1994 | Sugawara et al. | 375/12 |
| 5,392,163 | 2/1995 | Higichi et al. | 360/10.1 |
| 5,436,771 | 7/1995 | Yun | 360/65 |
| 5,446,539 | 8/1995 | Minakawa | 358/340 |
| 5,448,424 | 9/1995 | Hirano et al. | 360/65 |
| 5,450,253 | 9/1995 | Seki et al. | 360/65 |
| 5,486,956 | 1/1996 | Urata | 360/65 |
| 5,523,896 | 6/1996 | Park | 360/10.3 |
| 5,577,079 | 11/1996 | Zenno et al. | 375/373 |
| 5,623,623 | 4/1997 | Kim et al. | 395/430 |
| 5,663,844 | 9/1997 | Gohda et al. | 360/65 |

FOREIGN PATENT DOCUMENTS

| | | | |
|---|---|---|---|
| 530776 | 3/1993 | European Pat. Off. | 360/65 |
| 404344302 | 11/1992 | Japan | 360/65 |

*Primary Examiner*—Douglas W. Olms
*Assistant Examiner*—David R. Vincent
*Attorney, Agent, or Firm*—Robin, Blecker & Daley

[57] ABSTRACT

In equalizing a reproduced signal with an equalizer having a variable equalizing characteristic, a decision as to whether or not the equalizing characteristic is to be varied is made by using the reproduced signal. For example, the frequency of performing an equalizing characteristic varying action is controlled according to an error rate in the reproduced signal. By virtue of this control, the equalizing characteristic can be quickly optimized in the event of a high error rate and, in a case where the error rate is low, the equalizing process can be stably carried out. Further, the equalizing characteristic is arranged to be varied while the level of the reproduced signal is in the neighborhood of a predetermined level, so that the equalizing characteristic can be optimized for such a signal that is most vulnerable to an adverse effect of the varying of the equalizing characteristic.

23 Claims, 25 Drawing Sheets

SCANNING PERIOD OF HEAD

OUTPUT OF REPRODUCTION EQUALIZER
(AT THE TIME OF SPECIAL REPRODUCTION)

------- ERROR
——— NORMAL

OUTPUT OF REPRODUCTION EQUALIZER 9

OUTPUT OF LEVEL DETECTING CKT 11

----- 100%
----- 50%
----- 0%

EQUALIZING CHARACTERISTIC VARYING PERIOD

OUTPUT OF COMPARISON CKT 12

--- H
--- L

CONTROL VOLTAGE FOR REPRODUCTION EQUALIZER 9

------------------- 0[V]

OUTPUT OF REPRODUCTION EQUALIZER 9

OUTPUT OF LEVEL DETECTING CKT 11

———— 100%
———— 50%
———— 0%

EQUALIZING CHARACTERISTIC VARYING PERIOD

OUTPUT OF COMPARISON CKT 12

———— H
———— L

CONTROL VOLTAGE FOR REPRODUCTION EQUALIZER 9

| KD | p | NEXT KD |
|---|---|---|
| POSITIVE | POSITIVE | NEGATIVE |
| POSITIVE | NEGATIVE | POSITIVE |
| NEGATIVE | POSITIVE | POSITIVE |
| NEGATIVE | NEGATIVE | NEGATIVE |

FIG. 31

| KD | p | NEXT KC |
|---|---|---|
| POSITIVE | POSITIVE | KC − KS |
| POSITIVE | NEGATIVE | KC + KS |
| NEGATIVE | POSITIVE | KC + KS |
| NEGATIVE | NEGATIVE | KC − KS |

REPRODUCING APPARATUS INCLUDING EQUALIZING MEANS WHICH EQUALIZES A REPRODUCED SIGNAL WHEN THE SIGNAL IS BETWEEN A FIRST AND SECOND LEVEL AND VARIES THE RESPONSE SPEED

This is a continuation application under 37 CFR 1.62 of prior application Ser. No. 08/527,856, filed Sep. 14, 1995 now abandoned.

BACKGROUND OF THE INVENTION

1. Field of the Invention

This invention relates to a reproducing apparatus and more particularly to control over the equalizing characteristic of an equalizing action on signals reproduced by the reproducing apparatus.

2. Description of Related Art

Among known apparatuses for recording and/or reproducing video and audio signals, digital VTRs are arranged to record and reproduce the video and audio signals as digital signals on and from magnetic tapes. FIG. 1 of the accompanying drawings shows in a block diagram the arrangement of a digital VTR of the above-stated kind. Referring to FIG. 1, a magnetic head 110 is arranged to electromagnetically convert a signal recorded on a magnetic tape 111. The level and the phase of the output of the magnetic head 110 are adjusted by a reproduction equalizer 112. The output thus adjusted is applied to a data detecting circuit 113. The data detecting circuit 113 restores the signal outputted from the reproduction equalizer 112 to a digital signal. An ECC decoder 114 is arranged to detect and correct errors of data outputted from the data detecting circuit 113 in accordance with an error detection correcting code which has been added at the time of recording. The corrected video data is applied to a video reproducing circuit 116 and the corrected audio data is applied to an audio reproducing circuit 115. A video signal reproduced and restored by the video reproducing circuit 116 is outputted to the outside from a video output terminal 118. An audio signal reproduced and restored by the audio reproducing circuit 115 is outputted to the outside from an audio output terminal 117.

A CPU 120 is arranged to operate in accordance with a program and fixed data stored in a ROM 121 and to control the whole VTR while storing variable data etc., in a RAM 122. The CPU 120 particularly controls the equalizing characteristic of the reproduction equalizer 112 in accordance with an error flag outputted from the ECC decoder 114. A bus 123 is arranged to interconnect the CPU 120, the ROM 121, the RAM 122, the reproduction equalizer 112 and the error flag output of the ECC decoder 114. The CPU 120, the ROM 121 and the RAM 122 jointly form an equalizer control circuit 119.

Reproduced signals generally have different frequency characteristics when they are reproduced from magnetic tapes of different manufacturers or reproduced from magnetic tapes on which signals are recorded by recording apparatuses which are either manufactured by different manufacturers or arranged to have different frequency characteristics. When signals recorded on such magnetic tapes are reproduced, the equalizing error of the reproduction equalizer 112 increases to give a larger number of error data in the reproduced signals. Therefore, the image quality and the sound quality of the reproduced signals greatly deteriorate. This is called the problem of interchangeability or secular variation.

To cope with the above-stated interchangeability or secular variation problem, there have been proposed some methods for carrying out an automatic equalizing action according to the characteristic of each tape. According to these methods, automatic equalization is carried out through a process called "hill-climbing" control or the like on the equalizing characteristic of a reproduction equalizing circuit in such a way as to decrease an error rate on the basis of a number of errors per unit time (error rate) detected, for example, by an ECC decoding circuit.

In the digital VTR shown in FIG. 1, the frequency characteristic for signal levels and phases of the reproduction equalizer 112 is adjusted, at the time of shipment from the factory, in such a way as to minimize the number of error flags obtained at the ECC decoder 114 when a signal recorded on a magnetic tape used for adjustment of the frequency characteristic is reproduced. The value of adjustment thus obtained is stored in the ROM 121.

To cope with the problem of interchangeability and secular variation, the frequency characteristic of the reproduction equalizer 112 can be automatically changed into an optimum frequency characteristic for the magnetic tape being actually used. The CPU 120 is arranged to minimize the number of error flags obtained from the ECC decoder 114 for the magnetic tape currently in use by changing the frequency characteristic of the reproduction equalizer 112, the frequency characteristic of its high frequency band portion in particular, as shown in FIG. 2. As shown in FIG. 3, the number of errors takes a minimum value at an optimum point of the frequency characteristic. If the gain of a high frequency band located before or after the optimum point of the frequency characteristic is strengthened or weakened, the number of errors increases. This optimum point can be found by a process called hill-climbing control. In other words, the number of errors is detected while gradually changing the gain of the high frequency band, and a point at which the number of errors becomes a minimum value is considered to be the optimum point.

The above-stated optimizing process also can be manually carried out by the user by gradually changing the frequency characteristic of the reproduction equalizer 112 while watching the number of error flags displayed.

As regards methods for recording a large amount of data on a magnetic tape in the case of a digital VTR or the like, a method called the helical scanning method has been known. According to the helical scanning method, a magnetic head is mounted on a rotary drum, and recording is performed aslant on the magnetic tape, as shown in FIG. 4, by causing the magnetic head to revolve while bringing the magnetic head into contact with the magnetic tape as shown in FIG. 4. In the case of the helical scanning method, a reproducing operation is performed normally by allowing the magnetic tape to travel at the same speed as a speed employed at the time of recording. Therefore, the output waveform of the reproduction equalizer 112 comes to have a nearly constant amplitude as shown in FIG. 5.

However, in the case of a special reproduction such as a reproducing operation for a high speed search, there arises the following problem. Since the magnetic tape, in this case, is caused to travel at a higher speed than the speed of recording, the magnetic head comes to traverse a plurality of recording tracks in each stroke of scanning instead of one track, as shown in FIG. 6. Then, as shown in FIG. 7, the output waveform of the reproduction equalizer 112 comes to take a so-called abacus-counter-like shape. According to the helical scanning method, in order to increase the density of recording, adjacent recording tracks are arranged to have different azimuth angles. At a recording track having an azimuth angle which differs from the magnetic head 110, the reproduction output of the magnetic head 110 becomes very small. In view of this, therefore, it is conceivable to arrange an amplifier to correct the varying amplitude of the signal outputted from the reproduction equalizer 112 to a certain constant amplitude as shown in FIGS. 8(a), 8(b) and 8(c). FIG. 8(a) shows the output of the reproduction equalizer 112. FIG. 8(b) shows a signal obtained by correcting the amplitude of the output of the reproduction equalizer 112. FIG. 8(c) shows the error flags of the ECC decoder 114.

However, even if the amplitude of the reproduced signal is corrected into a constant amplitude as mentioned above, noises increase at parts where the output level of the reproduction equalizer 112 is low. As a result, errors detected at the ECC decoder 114 increase. Then, as shown in FIG. 8(c), the output amplitude of the reproduction equalizer 112 comes to show errors at the parts where the output is less than a certain level and, in some extreme case, reproduced data becomes erroneous in its entirety.

Such a condition not only prevents optimum control over the reproduction equalizer 112, while the VTR is in process of optimizing the characteristic of the reproduction equalizer 112 to minimize the number of error flags according to the number of error flags, but also tends to cause errors to be frequently generated even in such a part that can be adequately reproduced under a normal condition as the signal amplitude of the part is large. As a result, images reproduced are of poor visibility.

Further, since the above-stated VTR is arranged to perform the hill-climbing control while monitoring the number of errors per unit time (error rate), the response of the equalizing circuit is too slow.

The above-stated automatic equalization allows control only over the simple frequency characteristic of the reproduction equalizing circuit. The control is aimed at suppressing so-called random errors. The random errors are probabilistic phenomena. If the reproduction system is in a good condition, there takes place no error or only one error per (recording) track. In actuality, the hill-climbing control is carried out by using error information obtained by averaging such errors.

However, in a case where the period of the above-stated averaging is short, adverse effects of quantizing errors which take place in decoding and an error burst caused by some disturbance become consequential. In such a case, with the equalizing circuit arranged to perform the hill-climbing control, many spurious hills will be generated to prevent the automatic equalization from being stably accomplished.

In order to suppress such adverse effects of quantizing errors and disturbances for stable control over the equalizing characteristic, it is necessary to average the number of errors over a certain period of time (over several hundreds of tracks). However, the above-stated conventional method for automatic equalization takes a long period of time for the error averaging process and thus has retarded the response of automatic equalization.

SUMMARY OF THE INVENTION

This invention is directed to the solution of the problems mentioned in the foregoing. It is, therefore, an object of this invention to provide a reproducing apparatus which is capable of stably carrying out an automatic equalizing process at a quick response speed.

Under this object, a reproducing apparatus according to this invention comprises error detecting means for detecting errors included in a reproduced signal, equalizing means for equalizing the reproduced signal, the equalizing means being arranged to vary an equalizing characteristic thereof according to an output of the error detecting means, level detecting means for detecting the level of the reproduced signal and comparing the detected level with a predetermined level, and control means for deciding, according to an output of the level detecting means, a period of time for which a varying action is to be performed on the equalizing characteristic of the equalizing means.

It is another object of this invention to provided a reproducing apparatus which is capable of carrying out an optimum equalizing process even in a case where the level of a reproduced signal is unstable.

Under that object, a reproducing apparatus according to this invention comprises error detecting means for detecting errors included in a reproduced signal, equalizing means for equalizing the reproduced signal, the equalizing means being arranged to vary an equalizing characteristic thereof according to an output of the error detecting means, and deciding means for deciding the frequency of varying the equalizing characteristic, according to a state of the errors included in the reproduced signal.

These and other objects and features of this invention will become apparent from the following detailed description of embodiments thereof taken in connection with the accompanying drawings.

BRIEF DESCRIPTION OF THE DRAWINGS

FIG. 25 shows the action of the P process.

FIG. 31 shows the action of the W-P process.

DETAILED DESCRIPTION OF THE PREFERRED EMBODIMENTS

Embodiments of this invention will be described in detail below with reference to the drawings.

Figure 1:
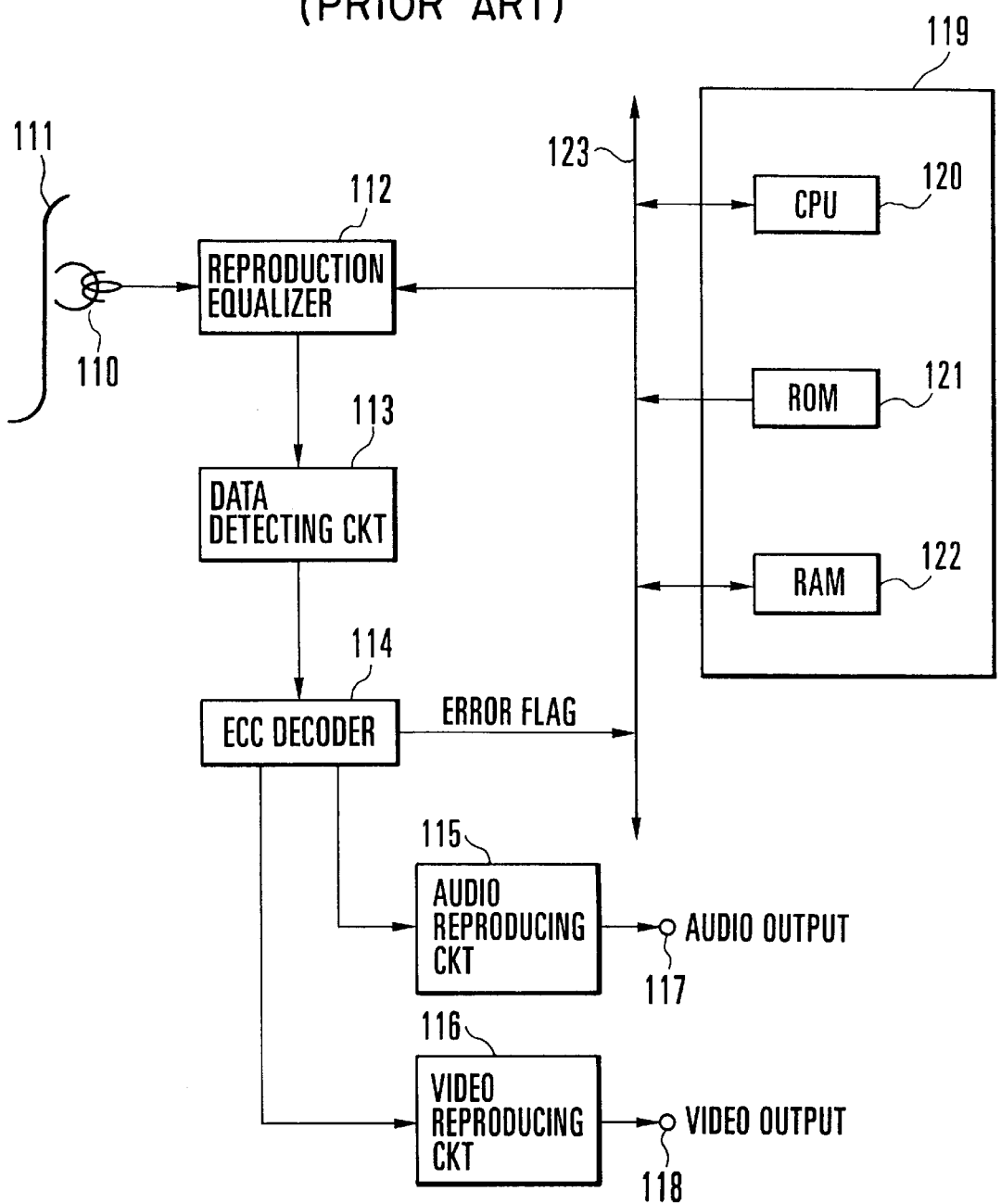
FIG. 1 is a block diagram showing a reproduction system of a digital VTR.
Figure 2:
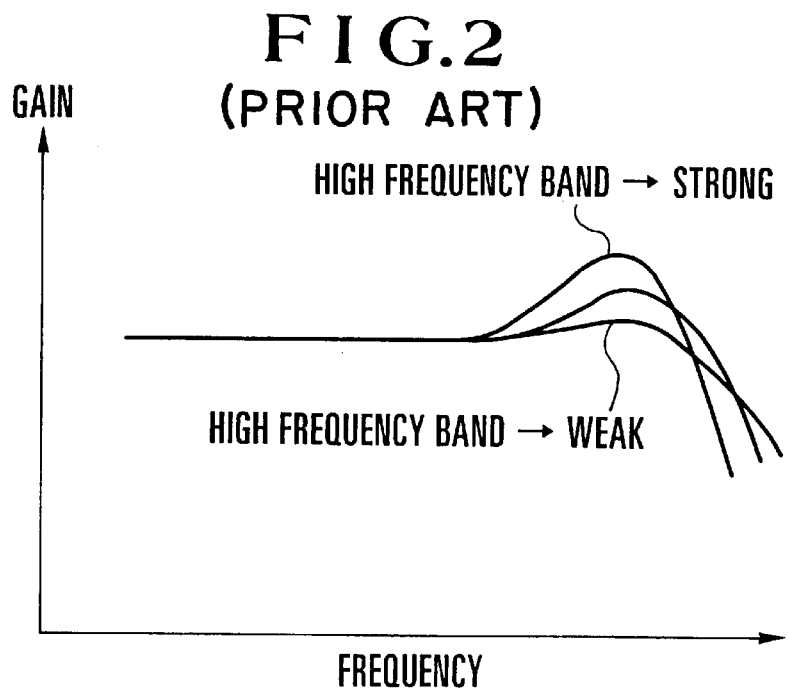
FIG. 2 shows the equalizing characteristic of the equalizer shown in FIG. 1.
Figure 3:
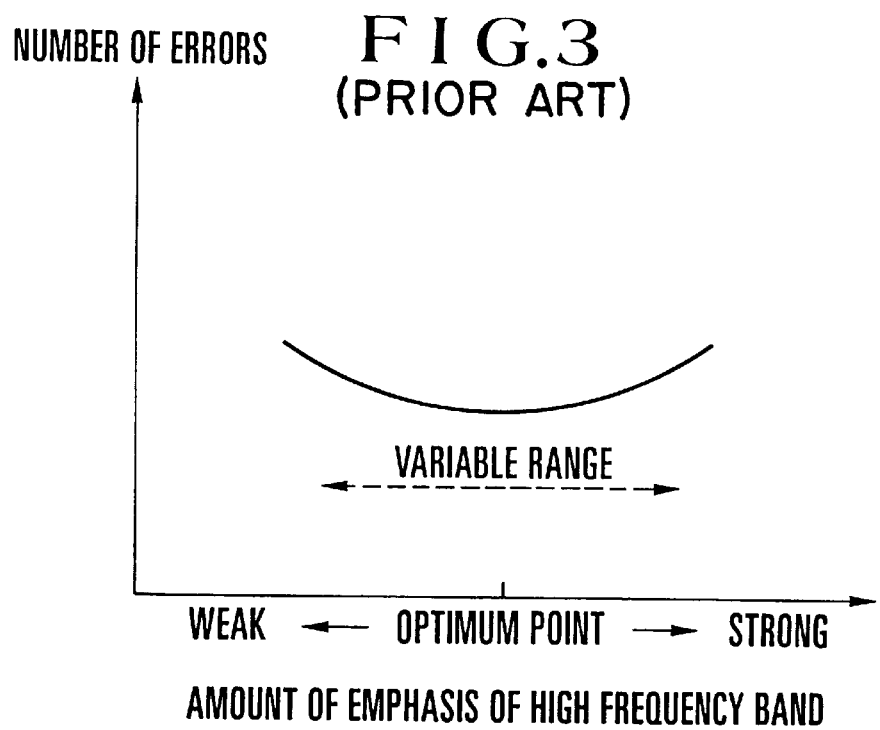
FIG. 3 shows a control action on the equalizing characteristic of the digital VTR shown in FIG. 1.
Figure 4:
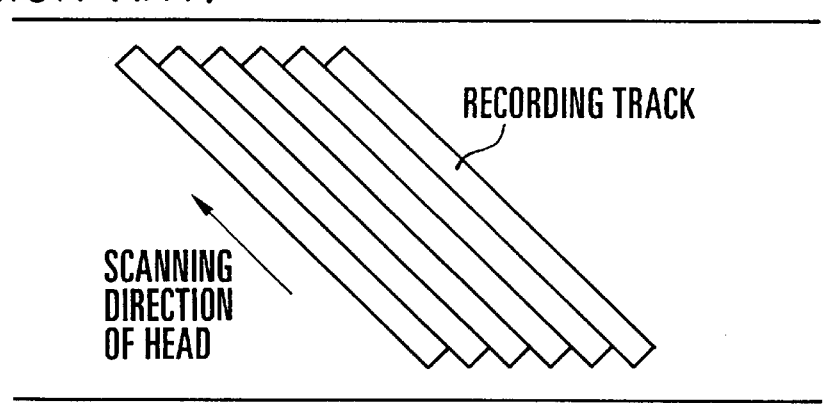
FIG. 4 shows recording tracks formed on a tape by the digital VTR shown in FIG. 1.
Figure 5:
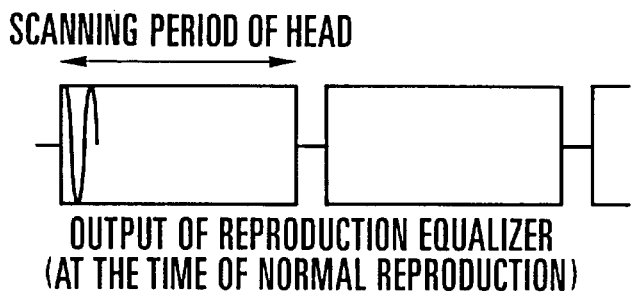
FIG. 5 shows how the output of the equalizer shown in FIG. 1 is obtained.
Figure 6:
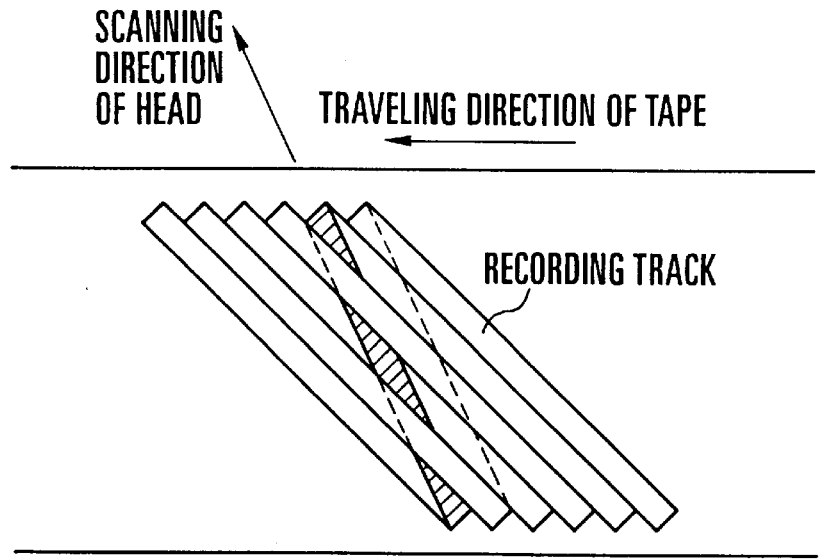
FIG. 6 shows a relation obtained between a head and recording tracks when the digital VTR of FIG. 1 is in process of special reproduction.
Figure 7:
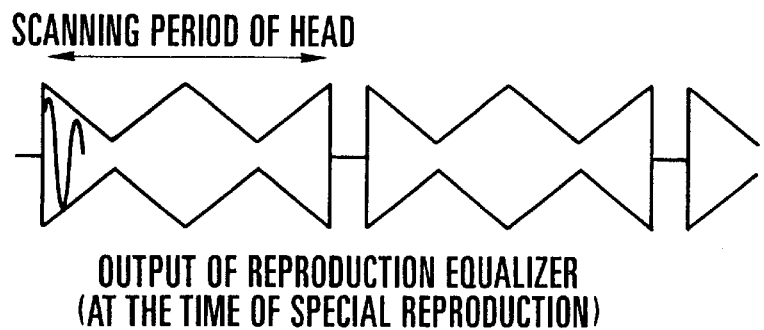
FIG. 7 shows how the output of the equalizer shown in FIG. 1 is obtained at the time of special reproduction.
Figure 8A:
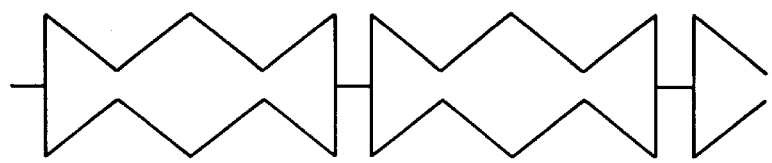
FIGS. 8(a), 8(b) and 8(c) show the states of the outputs of the equalizer and error flags.
Figure 8B:
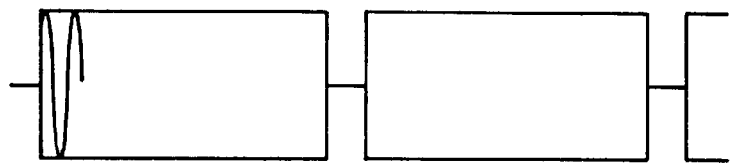
Figure 8C:
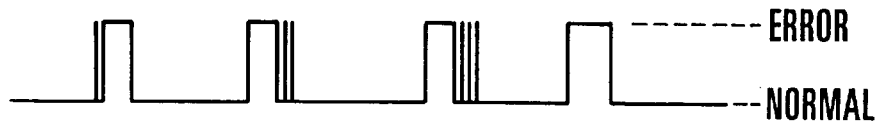
Figure 9:
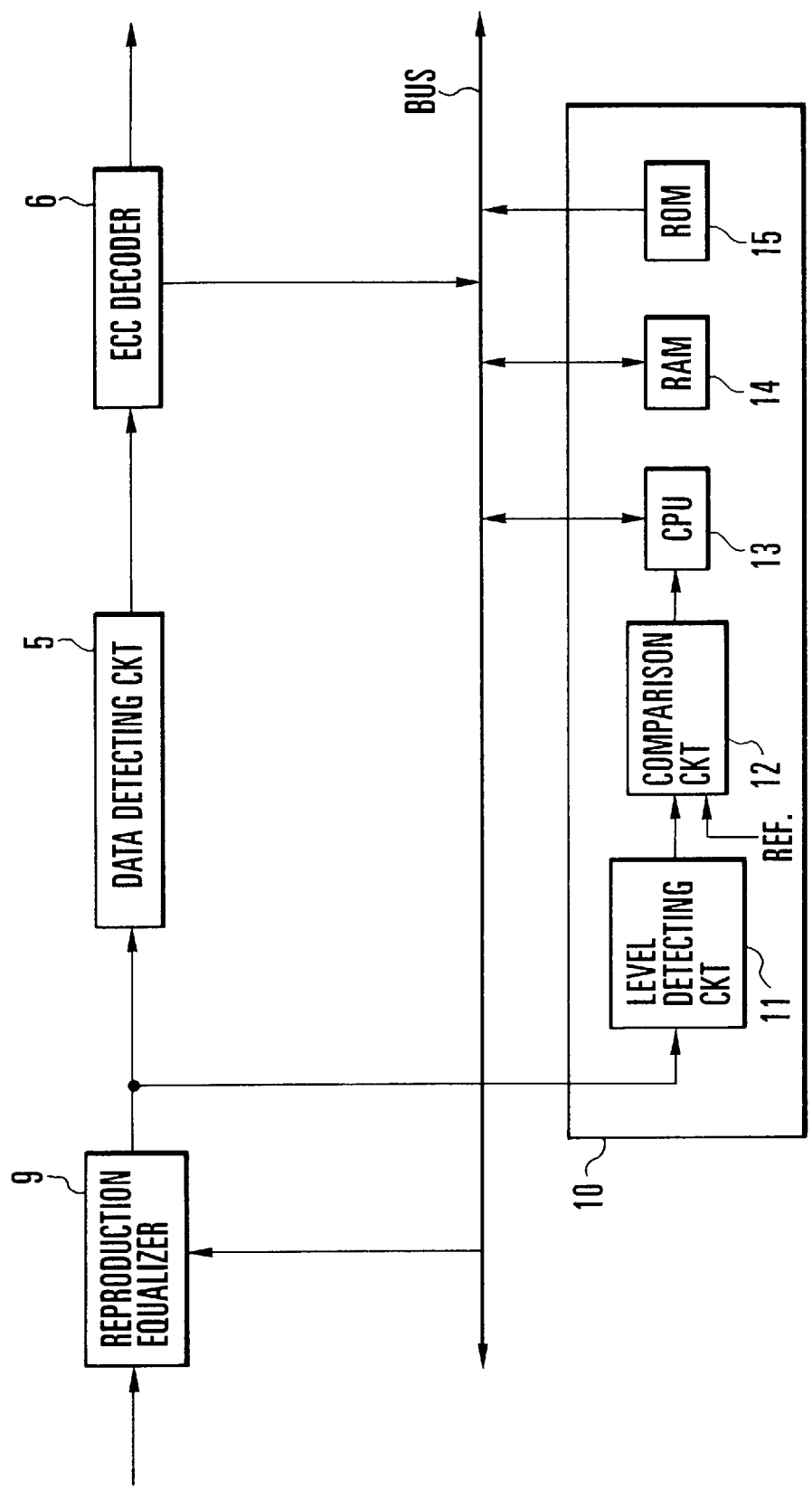
FIG. 9 is a block diagram showing essential parts of a digital VTR which is arranged according to this invention as an embodiment thereof.

FIG. 9 is a block diagram showing essential parts of a digital VTR arranged as an embodiment of this invention. Referring to FIG. 9, a reproduction equalizer 9 is arranged to equalize a signal reproduced from a magnetic tape as shown in FIG. 1 by a magnetic head which is not shown. A data detecting circuit 5 is arranged to restore an analog output obtained from the reproduction equalizer 9 to digital data. An ECC decoder 6 is arranged to detect and correct any error of the data outputted from the data detecting circuit 5 according to an error detecting-and-correcting code which is added at the time of recording. The output of the ECC decoder 6 is supplied to a signal processing circuit (not shown). A level detecting circuit 11 is arranged to detect the level of the signal outputted from the reproduction equalizer 9. A comparison circuit 12 is arranged to compare the output of the level detecting circuit 11 with a predetermined reference value (comparison value) and to output a signal indicating whether or not the level detection output is larger than the reference value.

A CPU 13 is arranged to control the equalizing characteristic of the reproduction equalizer 9 according to an error flag outputted from the ECC decoder 6 and an output of the comparison circuit 12. The CPU 13 has its program and fixed values stored in the ROM 15 and its temporary variables stored in the RAM 14. The error flag output of the ECC decoder 6, the CPU 13, the ROM 15, the RAM 14 and the control terminal of the reproduction equalizer 9 are interconnected via a bus. The CPU 13, the RAM 14, the ROM 15, the level detecting circuit 11 and the comparison circuit 12 jointly form an equalizer control circuit 10.

Figure 10:
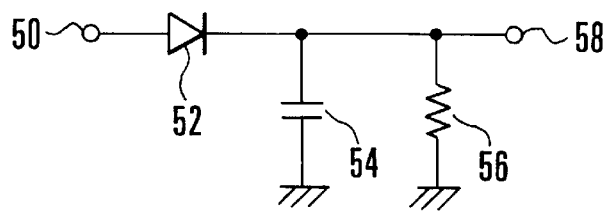
FIG. 10 shows the arrangement of a level detecting circuit included in FIG. 9.
Figure 11A:
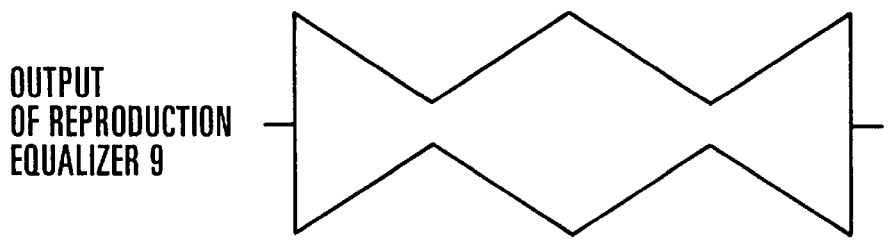
FIGS. 11(a) to 11(d) show an operation of the digital VTR shown in FIG. 9.
Figure 11B:
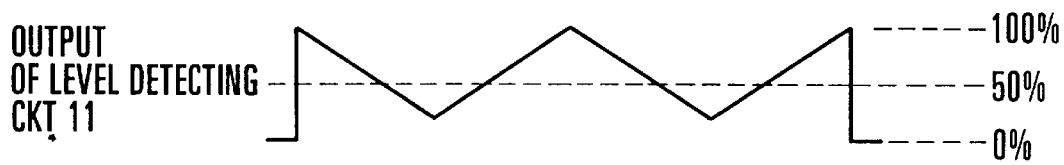
Figure 11C:
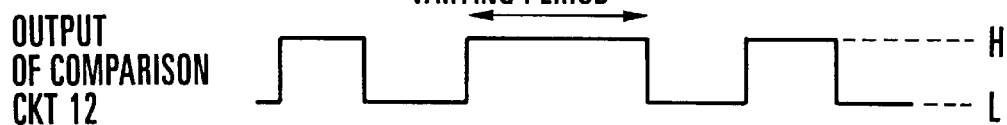
Figure 11D:
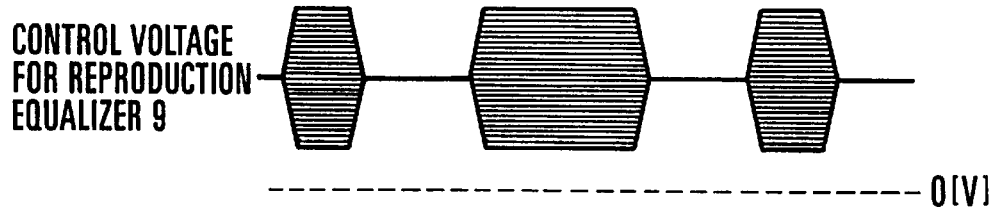

The level detecting circuit 11 has, for example, such a circuit configuration as shown in FIG. 10 and is arranged to envelope-detect the output of the reproduction equalizer 9. Specifically, the output signal of the reproduction equalizer 9 is inputted to an input terminal 50, and a diode 52 rectifies the signal coming from the input terminal 50. A parallel circuit composed of a capacitor 54 and a resistor 56 smoothes (or eliminates a high frequency band of) the output of the diode 52. The thus-smoothed output is supplied from an output terminal 58 to the comparison circuit 12.

Next, the equalizing characteristic of the reproduction equalizer 9 is controlled in the following manner, which represents a feature of the embodiment of this invention. The level detecting circuit 11 detects the envelope of the signal outputted from the reproduction equalizer 9. The comparison circuit 12 compares the output of the level detecting circuit 11 with the predetermined reference value and supplies a binary signal indicating the result of the comparison to the CPU 13. FIGS. 11($a$) to 11($d$) show waveforms obtained when the VTR is in process of making a high speed search. FIG. 11($a$) shows the waveform of the output of the reproduction equalizer 9. FIG. 11($b$) shows the waveform of the output of the level detecting circuit 11. FIG. 11($c$) shows the waveform of the output of the comparison circuit 12. FIG. 11($d$) shows the waveform of a control voltage applied to the reproduction equalizer 9.

The predetermined reference value or comparison value of the comparison circuit 12 is set, for example, at 50% of a maximum value of the output of the reproduction equalizer 9. In that case, as shown in FIG. 11($c$), the output of the comparison circuit 12 is at a low (L) level for a period during which the output of the reproduction equalizer 9 is less than 50% and is at a high (H) level for a period during which the output of the reproduction equalizer 9 is 50% or more. The CPU 13 is arranged to ignore the number of error flags coming from the ECC decoder 6 for a period during which the output of the comparison circuit 12 is at the L (low) level. For a period during which the output of the comparison circuit 12 is at the H (high) level, the CPU 13 performs either hill-climbing control or wobbling to optimize the equalizing characteristic of the reproduction equalizer 9.

More specifically, in one conceivable method, a computing process for obtaining an optimum equalizing characteristic is suspended and a control value to be applied to the reproduction equalizer 9 is held, for a period during which the level of the output of the comparison circuit 12 is low. In another conceivable method, for a period during which the output level of the comparison circuit 12 is low, the computing process is continued on the assumption that the number of error flags outputted from the ECC decoder 6 is either zero or remains at a value obtained immediately before the output level becomes low, and the reproduction equalizer 9 is continuously controlled according to a control value resulting from the computing process. In either case, the control over the equalizing characteristic is virtually held in abeyance for a period during which the output of the comparison circuit 12 is at the low (L) level.

Figure 12A:
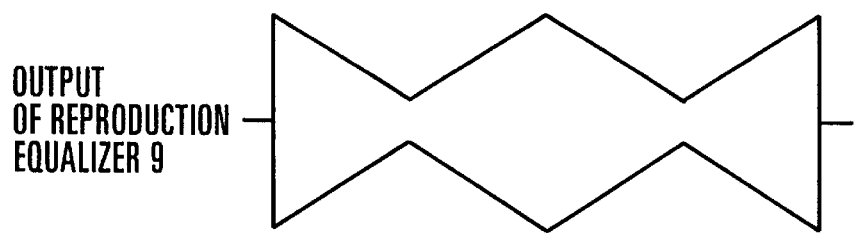
FIGS. 12(a) to 12(d) show another operation of the digital VTR shown in FIG. 9.
Figure 12B:
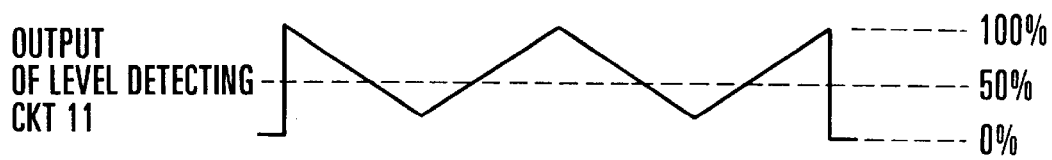
Figure 12C:
Figure 12D:
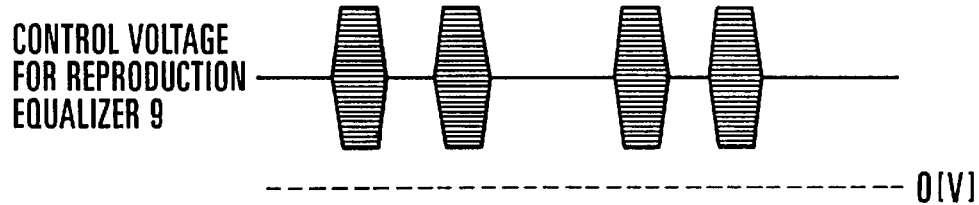

In the case of the embodiment described, the period during which the amplitude of the output of the reproduction equalizer 9 is 50% or more of the maximum amplitude of the reproduced signal is considered to be a period for performing control over the equalizing characteristic of the reproduction equalizer 9 by the CPU 13, i.e., an equalizing characteristic varying period. In actuality, however, noises are very few in the neighborhood of the maximum amplitude of the reproduced signal and errors do not much increase even if the equalizing characteristic of the reproduction equalizer 9 deviates somewhat from an optimum point. Therefore, the comparison circuit 12 may be arranged to detect data in the neighborhood of 50% of the maximum amplitude, as shown in FIGS. 12(a) to 12(d), and the equalizing characteristic of the reproduction equalizer 9 may be changed to permit accurate detection of data in the neighborhood of 50% of the maximum amplitude. FIGS. 12(a) to 12(d) show waveforms obtained in the case of a high speed search like in the case of FIGS. 11(a) to 11(d). FIG. 12(a) shows the output of the reproduction equalizer 9. FIG. 12(b) shows the output of the level detecting circuit 11. FIG. 12(c) shows the output of the comparison circuit 12 which is modified to detect data in the neighborhood of 50% of the maximum amplitude. FIG. 12(d) shows the waveform of the control voltage to be applied to the reproduction equalizer 9.

By virtue of this modification, the equalizing characteristic of the reproduction equalizer 9 can be optimized for reproduced data obtained around a level where noises tend to increase. Therefore, even in the event of making a high speed search, images can be naturally reproduced without losing their continuity.

While the above-stated embodiment is arranged to detect the output level of the reproduction equalizer 9, the arrangement may be changed to detect the level of a signal which permits detection of changes taking place in the amplitude of reproduction output of the magnetic head, such as the input of the reproduction equalizer 9. It is also possible to arrange an automatic gain control (AGC) circuit to amplify the output of the reproduction equalizer 9 and to use its internal gain control voltage as a level detecting signal.

A sequence of processes to be carried out for control over the equalizing characteristic by using the above-stated reproduction equalizing circuit is next described in detail as follows.

Figure 13:
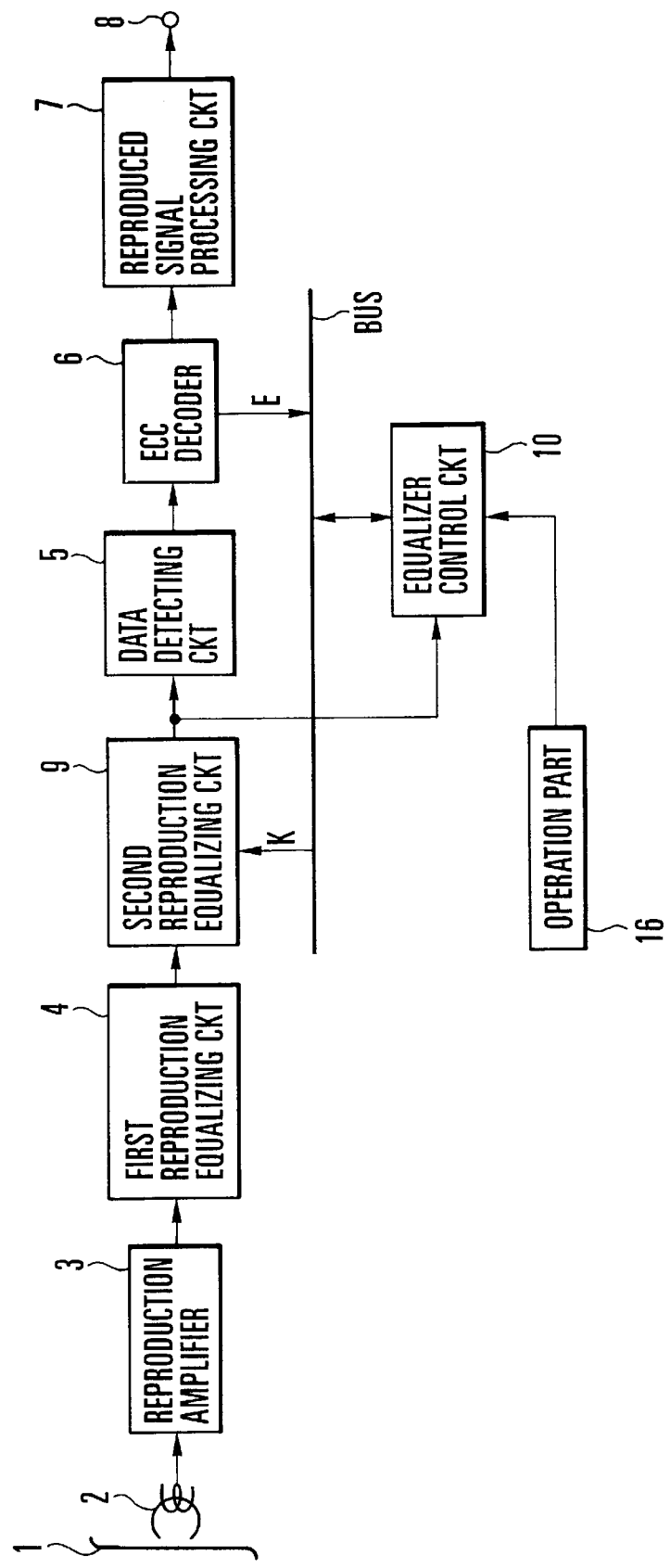
FIG. 13 is a block diagram showing the digital VTR arranged as the embodiment of this invention.

FIG. 13 is a block diagram showing the arrangement of a reproduction system of a digital VTR which is the embodiment of this invention. Referring to FIG. 13, a signal reproduced from a tape 1 by a head 2 is amplified by a reproduction amplifier 3. The amplified signal is supplied to a first reproduction equalizing circuit 4. The first reproduction equalizing circuit 4 has a fixed equalizing characteristic and is arranged to perform an equalizing process with the fixed equalizing characteristic on the signal outputted from the amplifier 3 and to supply the processed signal to a second reproduction equalizing circuit 9.

The second reproduction equalizing circuit 9 is arranged to have a variable equalizing characteristic, in the same manner as the circuit 9 shown in FIG. 9, and to perform a further equalizing process on the signal coming from the first reproduction equalizing circuit 4. The equalized signal is supplied from the second reproduction equalizing circuit 9 to a data detecting circuit 5 and an equalizer control circuit 10.

Upon receipt of the reproduced signal which varies in amplitude in an analog manner, the data detecting circuit 5 converts the reproduced signal again into a digital signal. The converted digital signal is supplied to an ECC decoder 6. The ECC decoder 6 then corrects any erroneous data included in the reproduced signal by using parity data added to the signal at the time of recording. The ECC decoder 6 generates error flags for data remaining uncorrected showing that the data is uncorrected.

The reproduced signal the code error of which has been corrected by the ECC data decoder 6 is supplied to a reproduced signal processing circuit 7. Then, the reproduced signal processing circuit 7 performs various signal processing actions such as rearrangement of data, expanding and interpolating processes, etc. The signal thus processed is outputted from an output terminal 8.

The equalizer control circuit 10 may be arranged in the same manner and to operate on the same principle as what is shown in FIG. 9. Further, an operation part 16 is provided for giving instructions for switching between a plurality of modes of the VTR including a special reproduction mode and a normal reproduction mode. The CPU 13 which is included in the equalizer control circuit 10 is arranged to control the frequency characteristic of the second reproduction equalizing circuit 9 on the basis of number-of-errors information E which is obtained from the ECC decoder 6.

Figure 14:
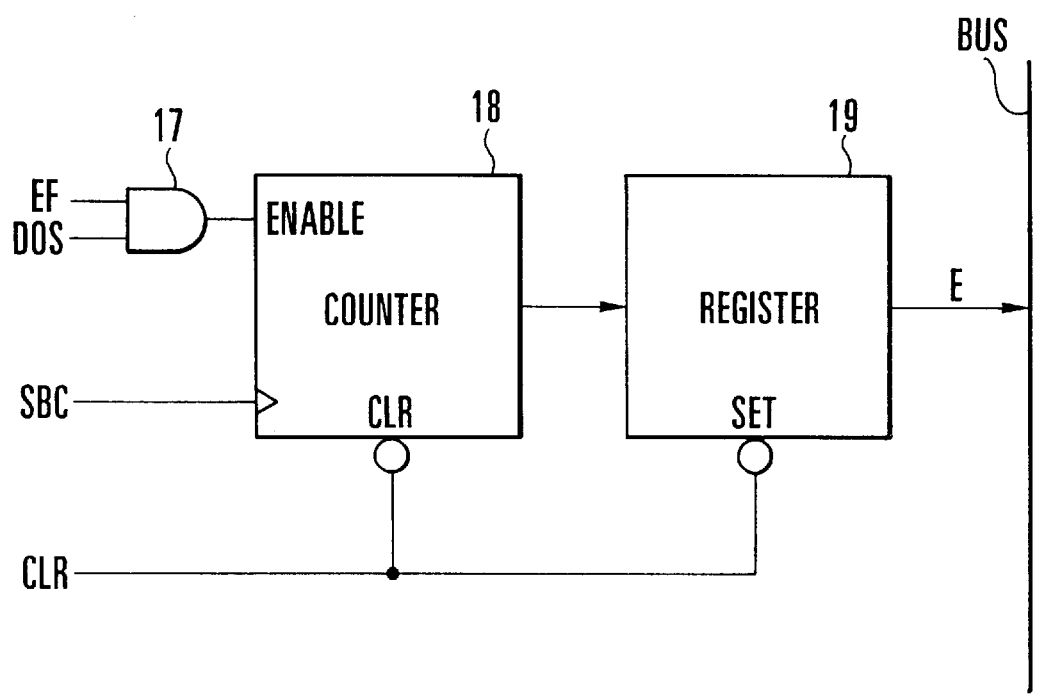
FIG. 14 shows the arrangement of a number-of-errors information generating part of an ECC decoder which is included in the digital VTR shown in FIG. 13.
Figure 15:
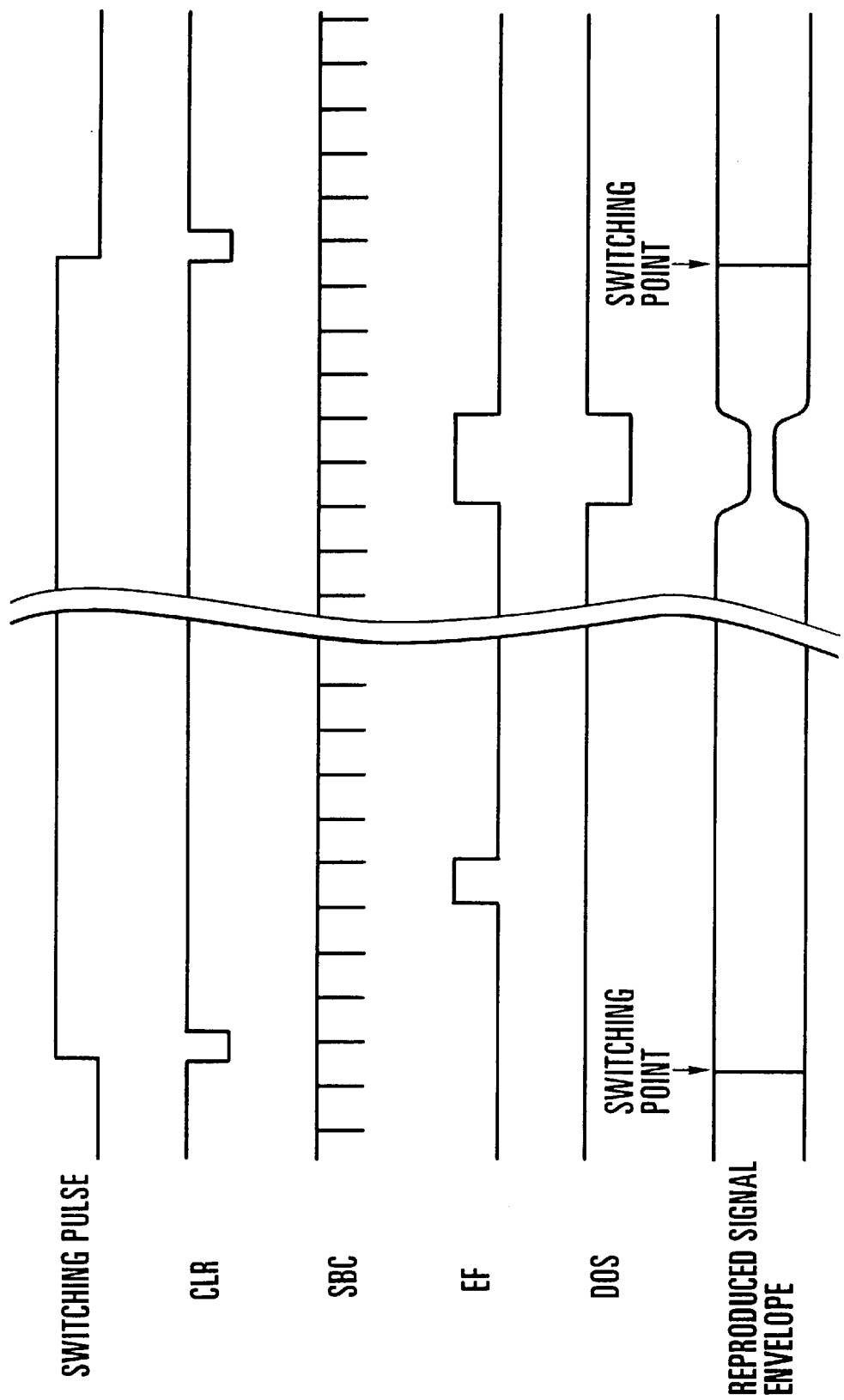
FIG. 15 is a timing chart showing an operation of the circuit shown in FIG. 14.

FIG. 14 is a block diagram showing by way of example the arrangement of a part for forming the number-of-errors information E within the ECC decoder 6. FIG. 15 is a timing chart showing the operation of the circuit arranged as shown in FIG. 14. The ECC decoder 6 forms the number-of-errors information E as described below.

Referring to FIG. 14, there are provided an error flag mask circuit 17, an error flag counting counter 18 and a register 19 for storing the number-of-errors information E. As mentioned in the foregoing, the ECC decoder 6 is arranged to correct errors in the reproduced signal and generate error flags for such errors that can not be corrected. In this instance, a plurality of blocks each consisting of a plurality of samples of image data are collected. Then, an ECC decoding action is performed in units of blocks called "synchronizing blocks" with synchronizing signals added to the blocks. Error flags detected are thus generated in units of synchronizing blocks. The level of the error flag EF becomes high when an error is detected. The level of a dropout signal DOS becomes low when the output level of the reproduced signal becomes lower than a predetermined level. One synchronizing block clock pulse SBC is generated for every synchronizing block period.

Since the error flags EF are generated in units of synchronizing blocks as mentioned above, the error flags EF and the synchronizing block clock pulses SBC are synchronized with each other. A clear signal CLR is arranged to have its level become low at the rise and the fall of switching pulses for the reproducing head 2.

The operation of the circuit arrangement shown in FIG. 14 is next described with reference to the timing chart of FIG. 15. Further, although only one head 2 is shown in FIG. 13 for the sake of illustration, two heads are actually mounted on a rotary drum which is not shown. The tape is traced alternately by these two heads.

The count value of the counter 18 is cleared at a switching point at which a tape tracing state is switched from tracing by one of the two heads over to tracing by the other head. With the counter 18 thus cleared, the counter 18 begins to count the error flags EF. The counter 18 is provided with a clock enable terminal and is arranged to count upward when the level of the error flag EF is high and that of the dropout signal DOS is also high. Since any error flag for an error generated by a dropout while the reproduced signal is still in process is masked by the dropout signal DOS, such error flags are not counted by the counter 18.

With a number of errors counted for one track, when the operation comes to a next head switching point, the count value of the counter 18 is set at the register 19 and the counter 18 is cleared in response to the clear signal CLR. Then, the counter 18 begins to count the error flags EF for a next track.

At the same time, an error data request (not shown) is set at a high level. The error data request is a flag which indicates that the number-of-errors information E has been set at the register 19.

When the error data request flag is generated, the CPU 13 takes in the number-of-errors information E and returns an error data acknowledgement (not shown) to the ECC decoder 6. Upon receipt of the error data acknowledgement, the ECC decoder 6 sets the error data request at a low level.

The number of errors in every track is thus set at the register 19 as the number-of-errors information and the number-of-errors information is taken in the CPU 13.

Since any error that is caused by a dropout is not included in the number of errors of the number-of-errors information as mentioned above, random errors are mainly reflected by the number-of-errors information. The arrangement of masking the error flags EF with the dropout signal DOS in this manner enables the VTR to more stably carry out the automatic equalizing process.

Figure 16:
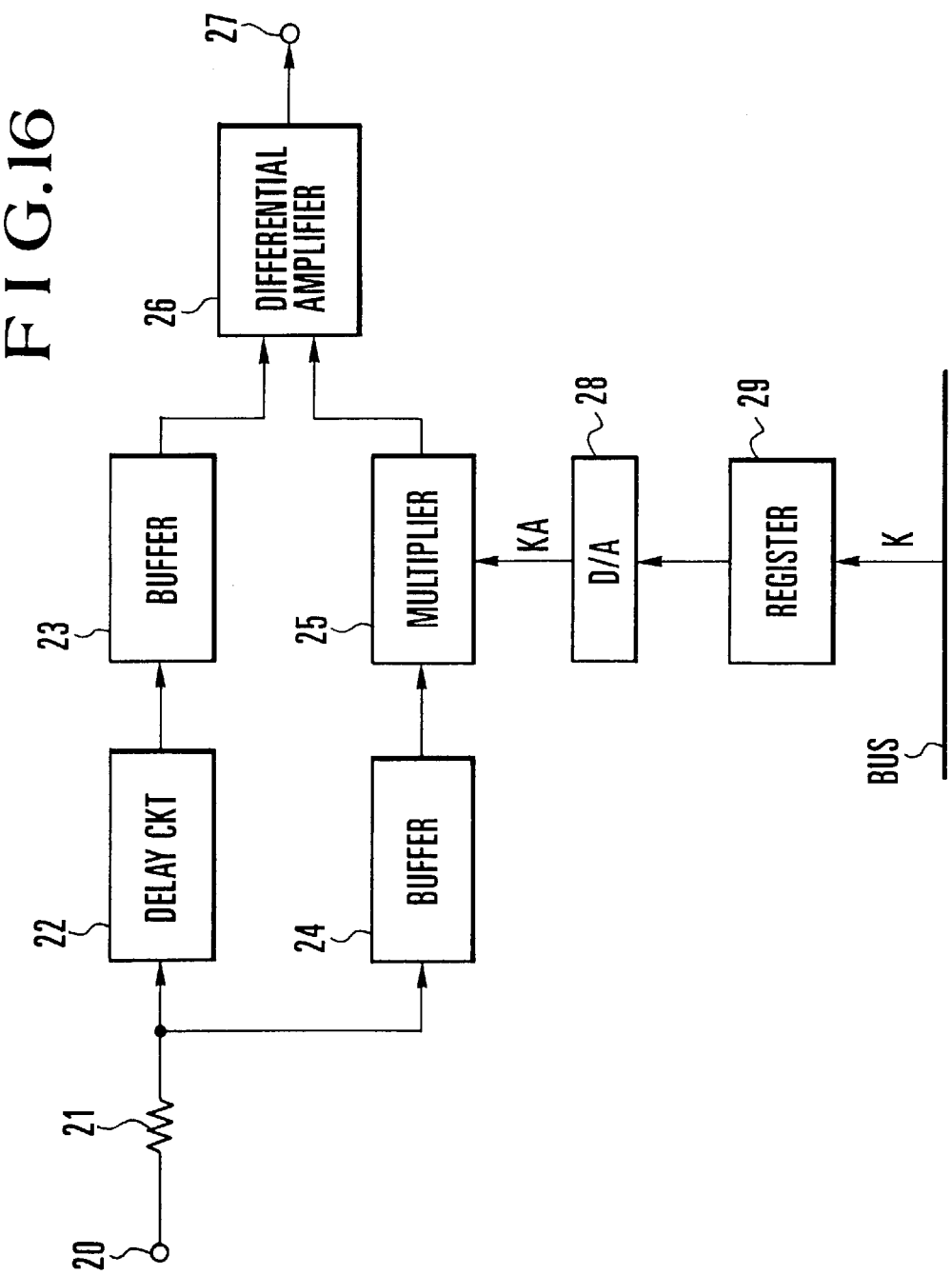
FIG. 16 is a block diagram showing the details of arrangement of a second reproduction equalizing circuit which is included in FIG. 13.

The second reproduction equalizing circuit 9 is next described in detail as follows. FIG. 16 is a block diagram showing the arrangement of the second reproduction equalizing circuit 9.

Referring to FIG. 16, an input terminal 20 is arranged to have the reproduced signal inputted from the first reproduction equalizing circuit 4. A delay circuit 22 is arranged to have a delay time t. A matching resistor 21 is arranged for the delay circuit 22. Buffers 23 and 24 are arranged to have high impedance inputs. There are further provided a multiplier 25 and a differential amplifier 26. An output terminal 27 is connected to the data detecting circuit 5. A D/A converter 28 is arranged to convert the output of a register 29 into an analog signal and to supply the analog signal to the multiplier 25. The register 29 is arranged to store a coefficient K to be used for control over the frequency characteristic of the equalizing circuit 9. To the input of the buffer 23 is supplied a signal which is obtained by delaying the input signal as much as a length of time t through the delay circuit 22. Since the impedance of the buffer 23 is high, the signal is reflected therefrom to be supplied to the delay circuit 22 in the reverse direction.

The output of the buffer 24 is supplied to the multiplier 25 to be multiplied by the coefficient K for control over the frequency characteristic. The output of the multiplier 25 is then supplied to the differential amplifier 26 together with the output of the buffer 23. In the circuit shown in FIG. 16, the transfer characteristic G of an output signal obtained at the output terminal 27 with respect to an input signal obtained at the input terminal 20 can be expressed as follows:

$$G=(1-2KA \cos \omega t) e^{j\omega t}$$

wherein $\omega$ is assumed to be 2 nf.

The characteristic is such that, although there is a delay of time t, no phase distortion takes place even when an amplitude characteristic caused to vary.

Figure 17:
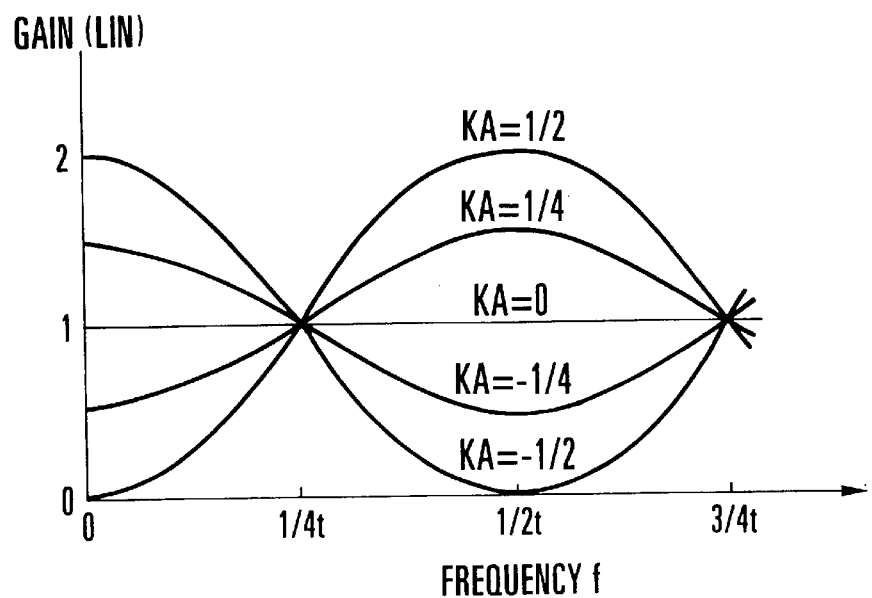
FIG. 17 shows changes taking place in the equalizing characteristic of the circuit shown in FIG. 16.

In the above formula, "KA" represents an analog value which is obtained by D/A converting the frequency characteristic control coefficient K. FIG. 17 shows the frequency characteristic of the transfer characteristic G obtained with the coefficient KA used as a parameter. The frequency characteristic of the second reproduction equalizing circuit 9 can be controlled by selecting such a delay time t that enables the second equalizing circuit 9 to be used as a reproduction equalizing circuit within a range f=½ t and by varying the coefficient K.

As mentioned above, the frequency characteristic of the second reproduction equalizing circuit 9 can be controlled by varying the frequency characteristic control coefficient. With the frequency characteristic varied in this manner, the number-of-errors information E which indicates the number of errors per track also varies.

Figure 18:
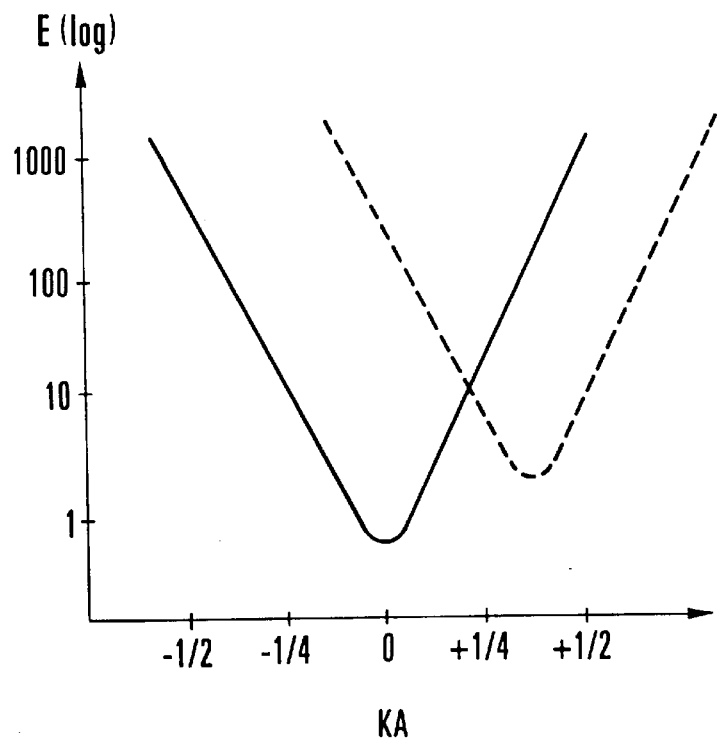
FIG. 18 shows variations of the equalizing characteristic of the embodiment of this invention in relation to error data.

FIG. 18 shows by way of example a relation between the number-of-errors information E and the control coefficient KA. In this case, the characteristic becomes more preferable accordingly as the number-of-errors information E is of a smaller value.

The characteristic curve of FIG. 18 changes, for example, from a full-line curve to a broken line curve due to the interchangeability and secular variation mentioned in the foregoing. In other words, the coefficient KA which corresponds to a minimum value of the number-of-errors information E changes due to changes taking place in the frequency characteristic of the reproduced signal. The CPU 13 ensures stable automatic equalization by adjusting the control coefficient K for the frequency characteristic while monitoring the number-of-errors information E.

The operation of the CPU 13 for the automatic equalization of the embodiment is described below with reference to flow charts shown in FIGS. 19 to 24.

Control to be performed over the equalizing characteristic according to the mode of reproduction is first described below with reference to FIG. 19.

Figure 19:
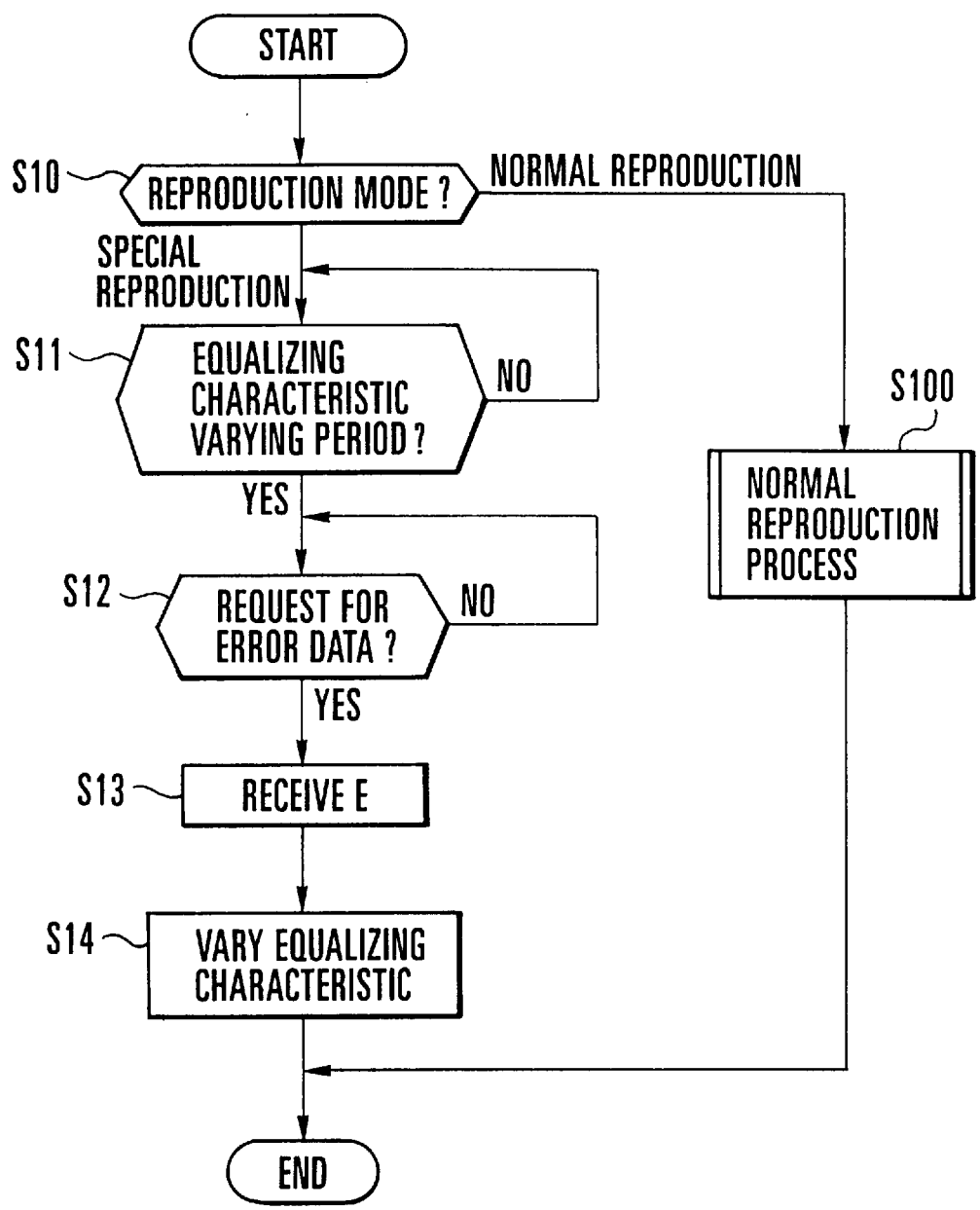
FIG. 19 is a flow chart showing the entire flow of operation for an equalizing characteristic control process to be performed by the embodiment shown in FIG. 13.

At a step S10 of FIG. 19, a discrimination is made between reproduction modes according to an instruction given from the operation part 16. If the mode is found to be a special reproduction mode such as a mode of making a high-speed search, the flow of operation proceeds to a step S11. If the mode is found to be a normal reproduction mode, the flow comes to a step S100 to execute processes for the normal reproduction.

At the step S11, a check is made, on the basis of the output of the comparison circuit 12, to find if it is an equalizing characteristic varying period. If so, the flow comes to a step S12 to wait for an error data request from the ECC decoder 6. Upon receipt of the error data request, the flow comes to a step S13. At the step S13, the number-of-errors inforamtion E is received. At a step S14, an equalizing characteristic varying process is executed and the flow comes to an end.

The step S11 of making a check for the varying period may be executed by carrying out the actions shown in FIGS. 11(a) to 11(d) and 12(a) to 12(d). The normal reproduction processes are next described as follows.

In the normal reproduction mode, it is possible for the head to accurately trace the recording tracks and the reproduction amplitude does not vary much. The CPU 13, therefore, ignores the output of the comparison circuit 12 in the normal reproduction mode.

The flow charts for the normal reproduction processes involve equalizing modes (hereinafter referred to as EQ mode) and variables, which are first described below.

In the case of this embodiment, the EQ modes include A, B and C modes. The A mode is an EQ mode for a state in which the error rate is poor, i.e., a state of generating many errors per unit time, and has the quickest response of control over the reproduction equalizing circuit 9. A variable A indicates the number of errors per track, and the number-of-errors information E is substituted for the variable A as it is. A variable A2 indicates the value of the variable A obtained for a previous track which immediately precedes the current track.

The C mode is another EQ mode for a state in which the error rate is good, i.e., a state of generating a few errors per unit time. In this mode, the control over the reproduction equalizing circuit 9 has the lowest response speed. A variable C is provided for adding up the number of errors for 256 tracks. A variable C2 indicates the total number of errors for 256 tracks sampled immediately before the current sample.

The B mode is an intermediate EQ mode between the A and C modes. In the B mode, one sample consists of 16 recording tracks. A variable B is provided for adding up the number of errors for 16 tracks. A variable B2 indicates the total number of errors for 16 tracks sampled immediately before the current sample.

A variable Amin is a minimum value of the variable A obtained within one sample section of the variable B. A variable Bmin is a minimum value of the variable B obtained within one sample section of the variable C. A variable i is a count value of a track counter and is an unsigned integer which, for example, consists of 8 bits. The variable i is incremented for every track and circulates within a range of 0 to 255. A variable p is an argument for a P process which will be described later and is arranged to receive and pass a difference between the current number of errors and the number of errors of a previous sample immediately preceding the current sample. A variable KD indicates a direction (plus or minus) in which changes take place in the frequency characteristic control coefficient K.

The sequences of operation of the CPU 13 is further described below with reference to flow charts.

Figure 20:
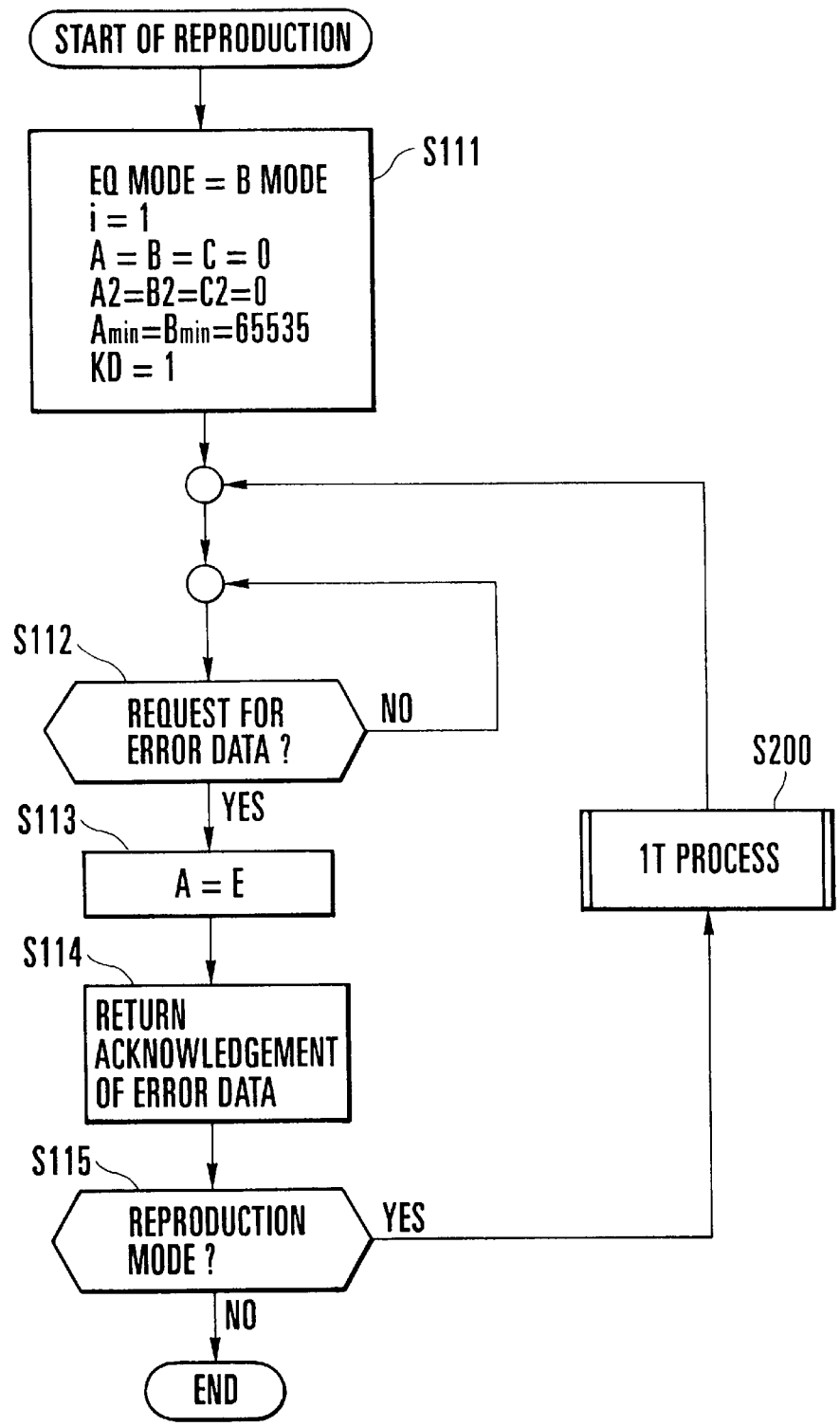
FIG. 20 is a flow chart showing the flow of an ordinary operation of the embodiment of this invention.

FIG. 20 is a flow chart showing automatic equalizing processes for the normal reproduction. At a step S111 in FIG. 20, the EQ mode setting and the variables of varied kinds are initialized. In this case, the EQ mode is set in the B mode. The variables Amin and Bmin are set at 65535. The variable i is set at 1. The variable KD is set at 1. Other variables are set at 0. The flow of operation then comes to a step S112.

At the step S112, a check is made for receipt of the error data request from the ECC decoder 6. The error data request is set at a high level when the number-of-errors information E is set at the register 19 shown in FIG. 14 as mentioned in the foregoing. The CPU 13 makes a check to find if the error data request is at a high level. If so, the flow comes to a step S113 to set the variable A at the value of the number-of-errors information E.

At a step S114, the error data acknowledgement is sent to the ECC decoder 6 and the flow comes to a step S115. At the step S115, a check is made to find if the VTR is in process of reproduction. If so, the flow comes to a step S200. If not, the flow comes to an end.

At the step S200, a 1T process which will be described later is performed. After that, the flow comes back to the step S112. Since the error data request is made for each of the tracks one by one as mentioned in the foregoing, the 1T process is performed for each of the tracks, one after another.

Figure 21:
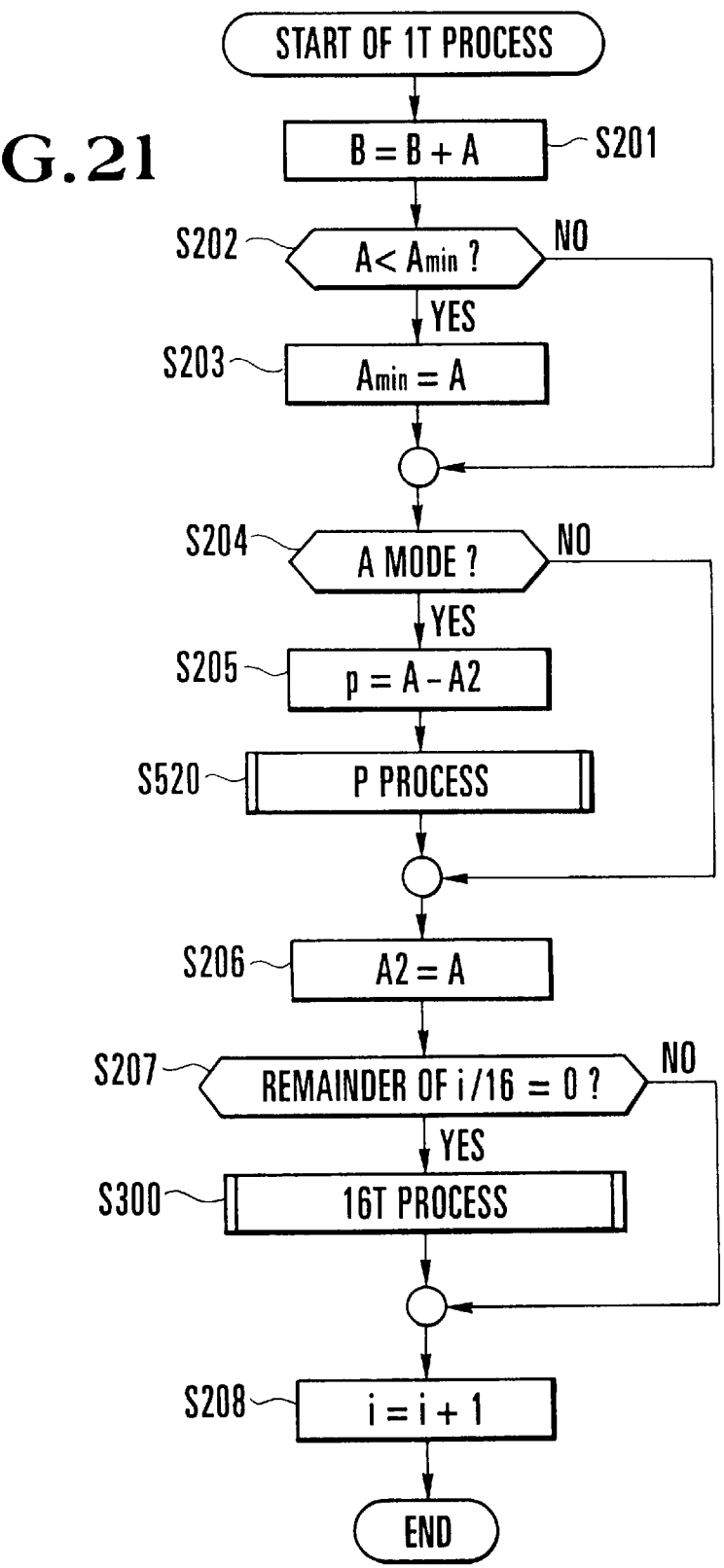
FIG. 21 is a flow chart showing the flow of a 1T process of the embodiment of this invention.

The 1T process is next described with reference to FIG. 21. At a step S201 after the start of the 1T process, the value of the variable A is added to the value of the variable B to update the variable B, and the flow comes to a step S202. At the step S202, a check is made to find if the value of the variable A is smaller than the value of the variable Amin. If not, the flow comes to a step S204. If so, the flow comes to a step S203.

At the step S203, the value of the variable A is substituted for the value of the variable Amin. The flow then comes to the step S204. At the step S204, a check is made to find if the EQ mode is the A mode. If not, the flow comes to a step S206. If so, the flow comes to a step S205. At the step S205, a value obtained by subtracting the value of the variable A2 from the variable A is substituted for the variable p. The flow then comes to a step S520 to perform the P process in a manner as will be described later. After the P process, the flow comes to the step S206.

At the step S206, the value of the variable A is substituted for the variable A2, and the flow comes to a step S207. At the step S207, a check is made to find if a remainder resulting from dividing the value of the variable i by 16 is "0". If not, the flow comes to a step S208. If so, the flow comes to a step S300.

At the step S300, a 16T process which will be described later is performed. After the 16T process, the flow comes to the step S208. At the step S208, the value of the variable i is incremented by one, and the 1T process comes to an end.

The 1T process is performed for every track and includes the functions of:
adding to the variable B for every track (step S201); obtaining the variable Amin (steps S202 and S203); performing the P process in the case of the A mode (steps S204, S205 and S520); updating the variable A2 (step S206); branching to the 16T process (steps S207 and S300); and incrementing the variable i (step S208).

In the case of the A mode, the P process is performed for each individual track.

Figure 22:
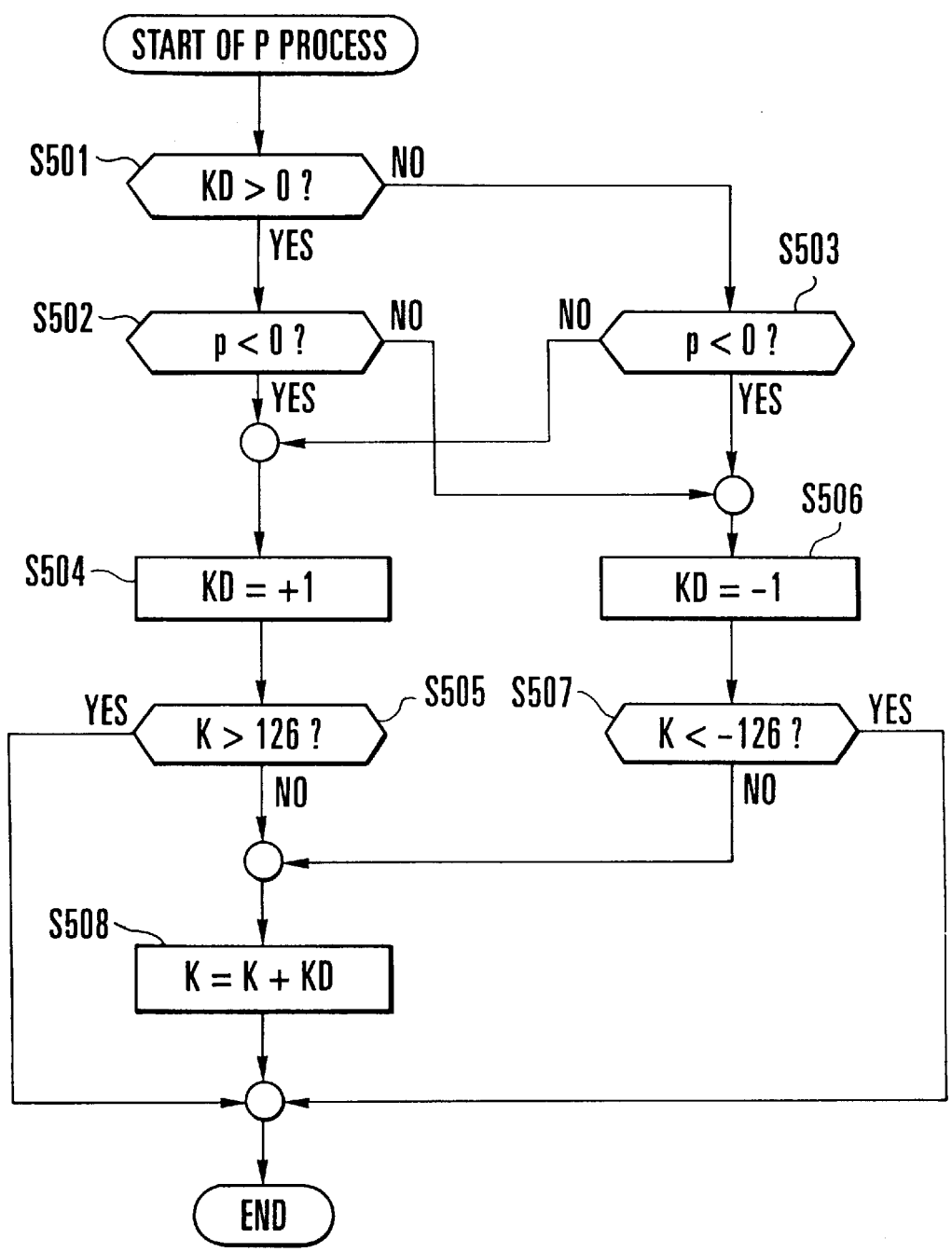
FIG. 22 is a flow chart showing the flow of a P process of the embodiment of this invention.

The P process is next described as follows. FIG. 22 is a flow chart showing the flow of operation for the P process. At a step S501, after the start of the P process, a check is made to find if the variable KD is of a positive value. If so, the flow comes to a step S502. If it is found to be of a negative value, the flow comes to a step S503. At the step S503, a check is made to find if the variable p is of a negative value. If so, the flow comes to a step S506. If it is found to be of a positive value, the flow comes to a step S504. At the step S504, 1 is substituted for the variable KD, and the flow comes to a step S505.

At the step S505, a check is made to find if the value of the control coefficient K is larger than 126. If so, the P process comes to an end. If it is found to be smaller than 126, the flow comes to a step S508. At the step S508, the value of the variable KD is added to the control coefficient K to update the control coefficient K, and the P process comes to an end.

Further, at the step S506, −1 is substituted for the variable KD. At a step S507, a check is made to find if the value of the control coefficient K is smaller than −126. If so, the P process comes to an end. If it is found to be larger than −126, the flow comes to the step S508 to update the control coefficient K by adding the value of the variable KD to the control coefficient K, and the P process comes to an end.

The P process is performed for varying the control coefficient K to be used for actual control over the frequency characteristic. The variable KD indicates a direction in which the frequency characteristic control coefficient K is varying. In other words, the variable KD indicates whether the value of the control coefficient K has increased or decreased from the value of a previous sample immediately preceding the current sample. The variable p indicates how the error rate of the previous sample immediately preceding the current sample has changed to the current error rate. This embodiment is arranged to decide in which way the control coefficient K is to be varied on the basis of the two variables.

For example, a state in which the variable KD is 1 while the variable p is of a negative value indicates that the number of errors has been decreased by varying the value of the control coefficient K in the positive direction. In this instance, the control coefficient K is caused to vary continuously in the positive direction.

Further, another state in which the variable KD is 1 while the variable p is of a positive value indicates that the number of errors has been increased by varying the value of the control coefficient K in the positive direction. In that instance, the control coefficient K is caused to conversely vary in the negative direction.

FIG. 25 is a truth table showing truth values of the P process described above.

In the case of this embodiment, the value of the control coefficient K is an integer which consists of 8 bits, has a sign and is variable within a range of +126.

As described above, in the A mode, the P process is performed for every individual track, and the frequency characteristic control coefficient K is controlled in such a way as to reduce errors.

Further, the A mode is selected in a case where the state of errors is bad, that is, where there are a large number of errors per unit time. In the A mode, the hill climbing control is performed at a quick response speed as the number of errors per track is of the order of several hundreds, which ensures a sufficient accuracy (in terms of S/N ratio) of the number-of-errors information.

Figure 23:
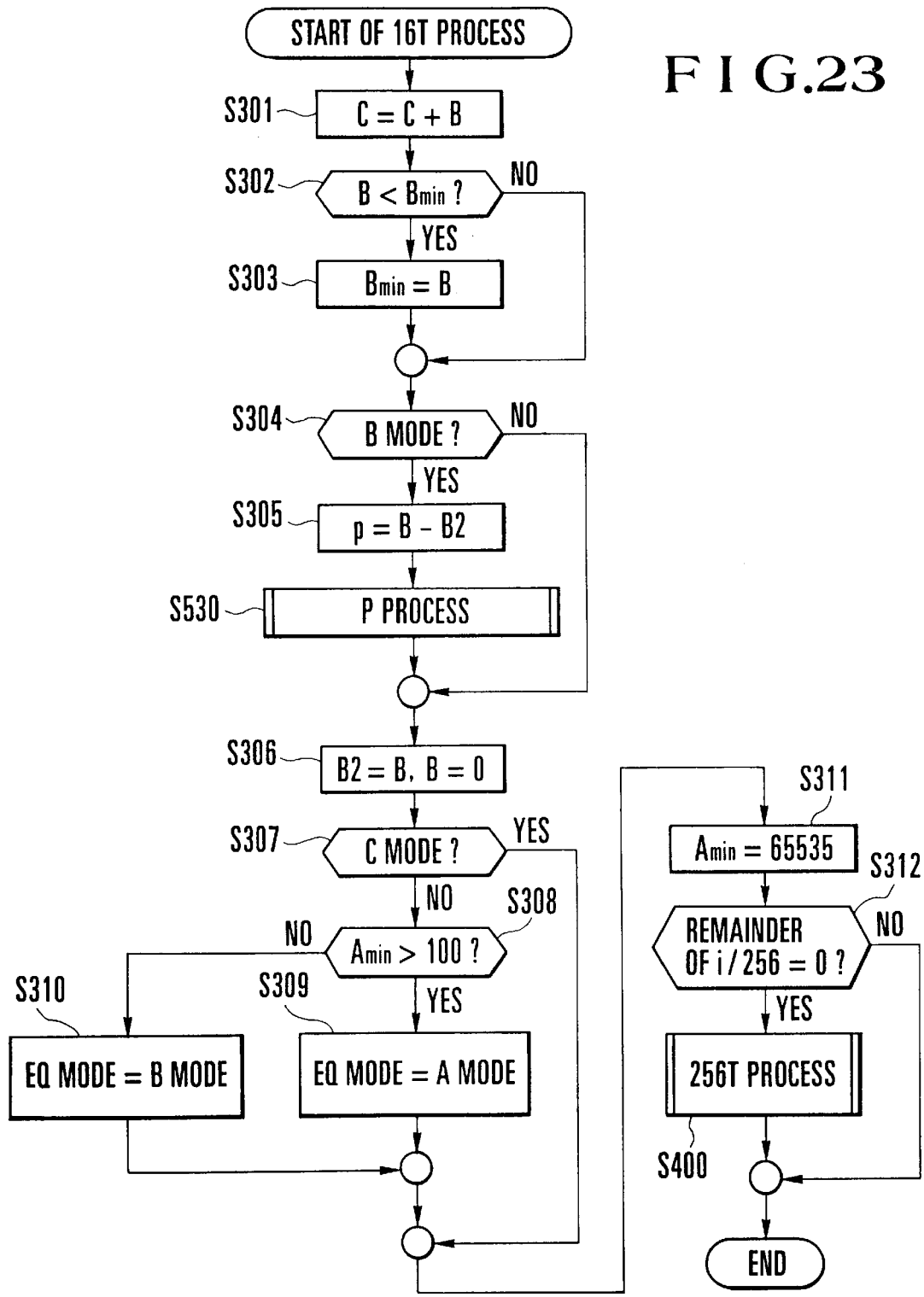
FIG. 23 is a flow chart showing the flow of a 16T process of the embodiment of this invention.

The flow of operation for the 16T process is next described with reference to FIG. 23, as follows. At a step S301 after the start of the 16T process, the value of the variable B is added to the value of the variable C to update the variable C. At a step S302, a check is made to find if the value of the variable B is smaller than the value of the variable Bmin. If not, the flow comes to a step S304. If so, the flow comes to a step S303. At the step S303, the value of the variable B is substituted for the variable Bmin, and the flow comes to the step S304.

At the step S304, a check is made to find if the VTR is in the B mode. If not, the flow comes to a step S306. If so, the flow comes to a step S305. At the step S305, a value B-B2 which is obtaining by subtracting the value of the variable B2 from that of the variable B is substituted for the variable p, and the flow comes to a step S530. At the step S530, the above-stated P process is performed. After the P process, the flow comes to the step S306.

At the step S306, the value of the variable B is substituted for the variable B2 and 0 is substituted for the variable B, and the flow comes to a step S307. At the step S307, a check is made to find if the VTR is in the C mode. If so, the flow comes to a step S311. If not, the flow comes to a step S308. At the step S308, a check is made to find if the value of the variable Amin is larger than 100. If so, the flow comes to a step S309 to set the EQ mode in the A mode as the number of errors in 16 tracks is larger than a predetermined value (100, in this case). If not, the flow comes to a step S310 to set the EQ mode in the B mode, instead of the C mode, as a minimum number of errors in 16 tracks is smaller than the predetermined value. After that, the flow comes to the step S311.

At the step S311, 65535 is substituted for the variable Amin, and the flow comes to a step S312. At the step S312, a check is made to find if a remainder obtained by dividing the variable i by 256 is "0". If not, the flow comes to an end. If there is no remainder, the flow comes to a step S400 to perform a 256T process, and the 16T process comes to an end.

The 16T process is performed for every 16 tracks and includes the functions of:
  adding to the variable C for every 16 tracks (step S301);
  obtaining the variable Bmin (steps S302 and S303);
  performing the P process in the case of the B mode (steps S304, S305 and S520); updating the variable B2 and initializing the variable B (step S306); selecting the A mode or the B mode (steps S307 to S310); initializing the variable Amin (step S311); and branching to the 256T process (steps S312 and S400).

In the case of the B mode, the hill climbing control is performed for the P process by using the variable B which is the total number of errors of 16 tracks obtained for every 16 tracks and the variable B2 which is the total number of errors of 16 tracks immediately preceding the current 16 tracks.

The B mode is selected in a case where the minimum value Amin of the number of errors per track is 100 or less. In such a case, in the A mode, the amount of the number-of-errors information is insufficient, in terms of an S/N ratio, for hill climbing control. Therefore, in the B mode, the control is performed on the basis of the variable B obtained by adding the number of errors of 16 tracks. Although the response speed becomes slower than in the case of the A mode, the hill climbing control can be stably carried out. Further, since the B mode is selected in cases where the number of errors is fewer than in the case of the A mode, the slower response has no adverse effect on the changes of the number of errors taking place in the reproduced signal and thus does not result in any serious deterioration in image quality.

Figure 24:
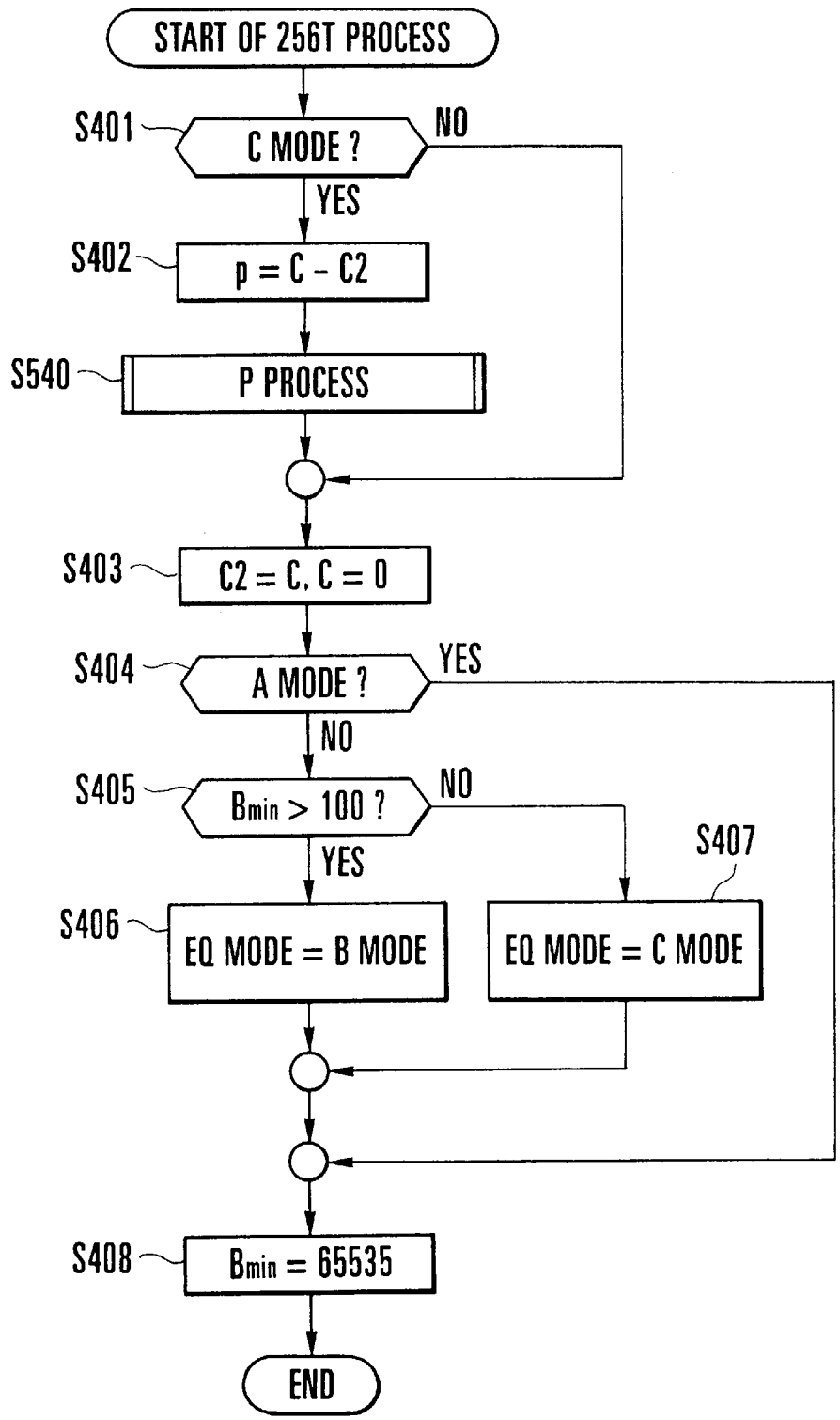
FIG. 24 is a flow chart showing the flow of a 256T process of the embodiment of this invention.

The 256T process which is shown in FIG. 24 is next described as follows. Referring to FIG. 24, at a step S401 after the start of the 256T process, a check is made to find if the EQ mode is the C mode. If not, the flow comes to a step S403. If so, the flow comes to a step S402 to substitute a value C-C2 which is obtained by subtracting the value of the variable C2 from that of the variable C is substituted for the variable p, and the above-stated P process is performed. After that process, the flow comes to the step S403.

At the step S403, the value of the variable C is substituted for the variable C2 and 0 is substituted for the variable C, and the flow comes to a step S404. At the step S404, a check is made to find if the EQ mode is the A mode. If so, the flow comes to a step S408. If not, the flow comes to a step S405. At the step S405, a check is made to find if the variable Bmin is larger than 100. If so, the flow comes to a step S406 to set the EQ mode in the B mode as the number of errors in 256 tracks is larger than a predetermined number (100, in this case). If not, the flow comes to a step S407 to set the EQ mode in the C mode as a minimum number of errors in the 256 tracks is less than the predetermined value. After that, the flow comes to a step S408.

At the step S408, 65535 is substituted for the variable Bmin, and the 256T process comes to an end.

The 256T process is performed for every 256 tracks and includes the functions of:
  performing the P process in the case of the C mode (steps S401, S402 and S540); updating the variable C2 and initializing the variable C (step S403); selection of the B mode or the C mode (steps S404 to S407); and initializing the variable Bmin (step S408).

In the case of the C mode, the hill climbing control is performed for the P process, for every 256 tracks, by using the variable C which is the total number of errors of 256 tracks and the variable C2 which is the total number of errors of previous 256 tracks immediately preceding the current 256 tracks.

The C mode is selected in cases where the minimum value Bmin of the number of errors of 16 tracks is 100 or less and the state of errors is very good having only a small number of errors per unit time. Therefore, the hill climbing control can be stably carried out by controlling the control coefficient K on the basis of the variable C which is obtained by adding up the number of errors of 256 tracks.

In the case of this embodiment, as described above, the EQ mode consists of three modes including the A, B and C modes. These modes are changed from one mode over to another according to the number of errors obtained per unit time from the ECC decoder 6. In the event of a large number of errors per unit time, the response speed of control over the equalizing circuit is increased by the change-over of the EQ mode, so that the equalizing characteristic can be promptly optimized. In the case of a small number of errors, on the other hand, the response speed of control over the equalizing circuit is decreased by the change-over of the EQ mode, so that an automatic equalizing action can be stably carried out without being affected by any disturbance.

The following describes other actions to be performed in the normal reproduction mode.

In the case of the embodiment described in the foregoing, the equalizing characteristic is controlled by varying the control coefficient K by one every time the P process is performed. However, in the case of another (a second) embodiment, the hill climbing control is carried out while wobbling the value of the control coefficient K at a predetermined amplitude with a certain value set at the center of the wobbling amplitude. Therefore, the second embodiment is capable of automatically equalizing at a higher response speed. The arrangement of the second embodiment is the same as the arrangement of the first embodiment shown in FIG. 13. The above-stated difference from the first embodiment mentioned is attained by the operating algorithm of the CPU 13.

In the second embodiment, the EQ mode, the variables of varied kinds and their usage are identical with those of the first embodiment described in the foregoing. In addition to these variables, the second embodiment is arranged to use two variables KC and KS. The variable KC is the center value of the wobbling. The variable KS indicates the size or amplitude of the wobbling. The value of the variable KS varies according to the mode selected. Further, in the case of this (second) embodiment, the sign of the variable KD is inverted for every sample. Since the value of wobbling can be expressed by the product of them, the value of the control coefficient K is repeatedly changed by ±4 for every track in the A mode, by ±2 for every 16 tracks in the B mode and by ±1 for every 256 tracks in the C mode.

With the embodiment arranged in this manner, the response speed of control is quick in the A mode which is for a bad state of errors and the automatic equalization can be stably carried out in the C mode which is for a good state of errors. The value of the control coefficient K can be expressed as K=KC+(KS×KD).

The operation of the second embodiment is described below, with reference to FIGS. 26 to 30. The description covers mainly the points in which the second embodiment differs from what has been described in the foregoing with reference to FIGS. 20 to 24.

Figure 26:
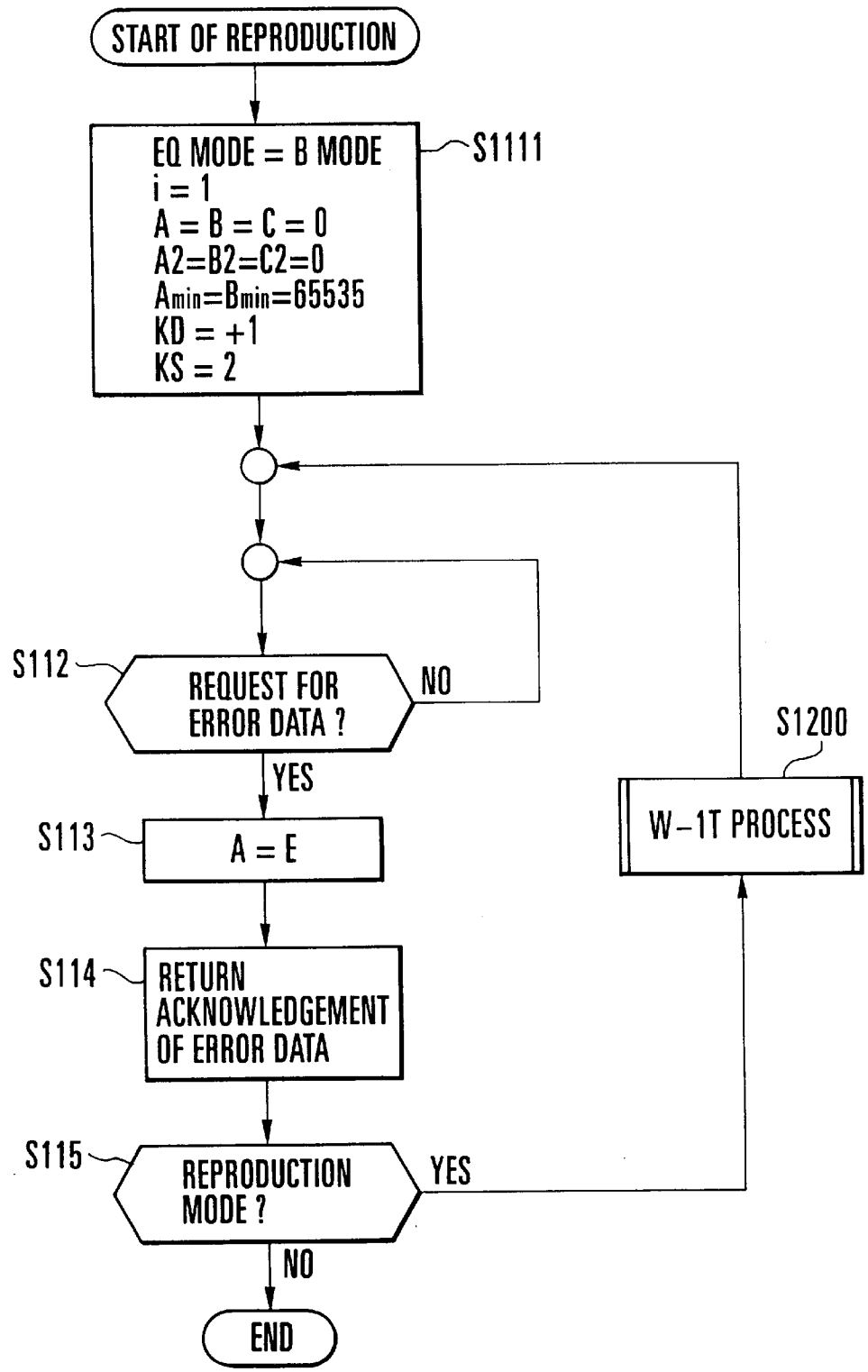
FIG. 26 is a flow chart showing an ordinary reproducing operation of a digital VTR which is a second embodiment of this invention.

FIG. 26 is a flow chart showing the operation of the embodiment to be performed for normal reproduction processes. In FIG. 26, steps executing the same processes as in FIG. 20 are indicated by the same step numbers.

At a step S1111 after the start of reproduction, the EQ mode and the variables of varied kinds are initialized. The EQ mode is set in the B mode. The variables Amin and Bmin are respectively set at 65535. The variable i is set at 1. The variable KD is set at 1. The variable KS is set at 2. Other variables are all initialized to 0. The flow then comes to the step S112. At the steps S112 to S114, a check is made for an error data request, and number-of-errors data is received from the ECC decoder 6. At the step S115, a check is made to find if the VTR is in a reproduction mode. If so, the flow comes to a step S1200 to perform a W-1T process which will be described below. After the W-1T process, the flow comes back to the step S112.

Figure 27:
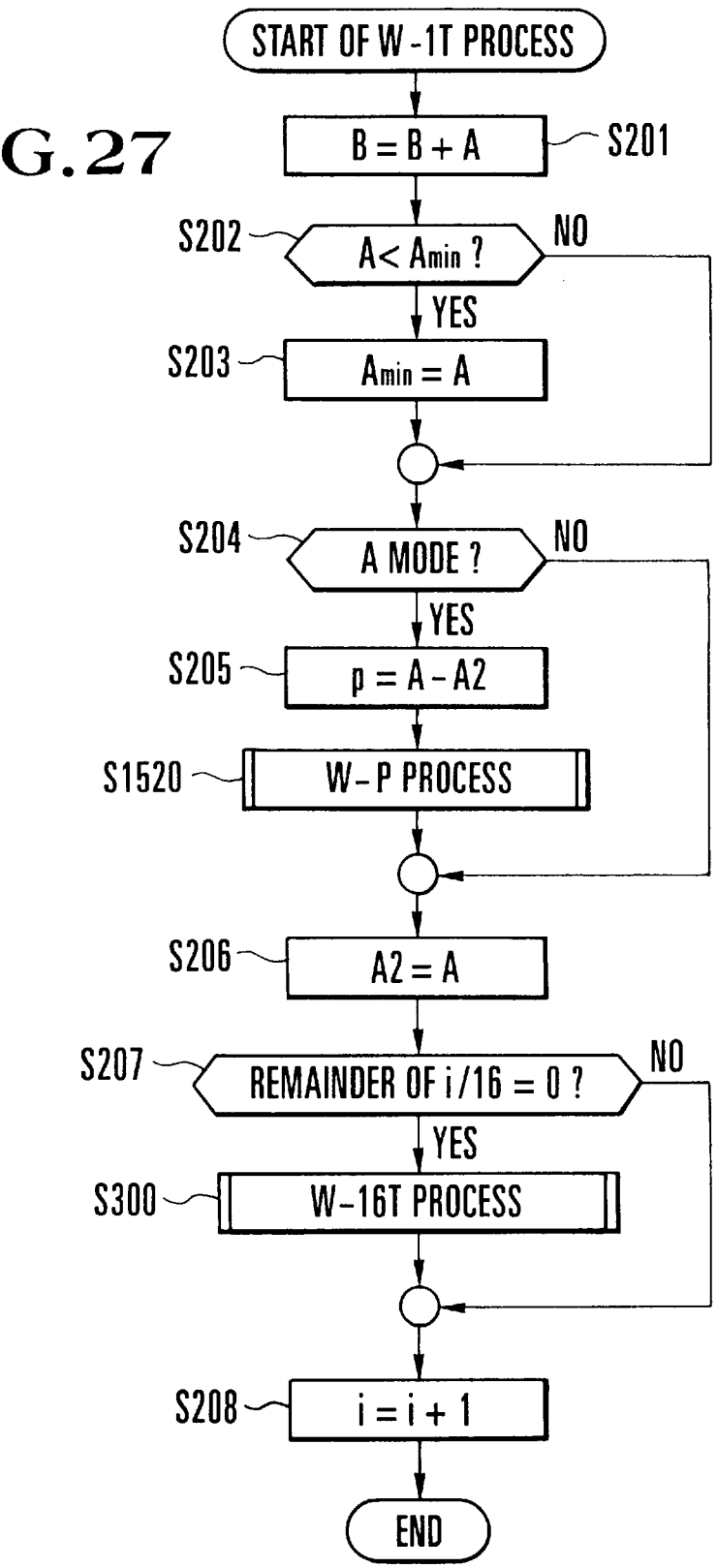
FIG. 27 is a flow chart showing the flow of a W-1T process of the second embodiment of this invention.

The W-1T process is described with reference to FIG. 27 as follows. At a step S201, after the start of the W-1T process, a value B+A obtained by adding the value of the variable A to the value of the variable B is substituted for the variable B. At a step S202, a check is made to find if the variable A is smaller than the variable Amin. If not, the flow comes to a step S204. If so, the flow comes to a step S203 to substitute the value of the variable A for the variable Amin, and the flow comes to the step S204.

At the step S204, a check is made to find if the EQ mode is the A mode. If not, the flow comes to a step S206. If so, the flow comes to a step S205 to substitute for the variable p a value A-A2 obtained by subtracting the value of the variable A2 from that of the variable A. The flow then comes to a step S1520 to perform a W-P process which will be described later. After the W-P process, the flow comes to the step S206.

At the step S206, the value of the variable A is substituted for the variable A2. At a step S207, an arithmetic operation i/16 is performed and a check is made to find if there is any remainder. If so, the flow comes to a step S208. If not, the flow comes to a step S1300 to perform a W-16T process which will be described later. After the W-16T process, the flow comes to the step S208. At the step S208, 1 is added to the variable i, and the W-1T process comes to an end.

The W-1T process differs from the 1T process described in the foregoing, in the W-P process of the step S1520 and the W-16T process of the step S1300. The W-16T process will be described later. The W-P process is executed for every track, if the EQ mode is the A mode, to control the actual value of the control coefficient K for control over the frequency characteristic in the same manner as the P process described in the foregoing.

Figure 28:
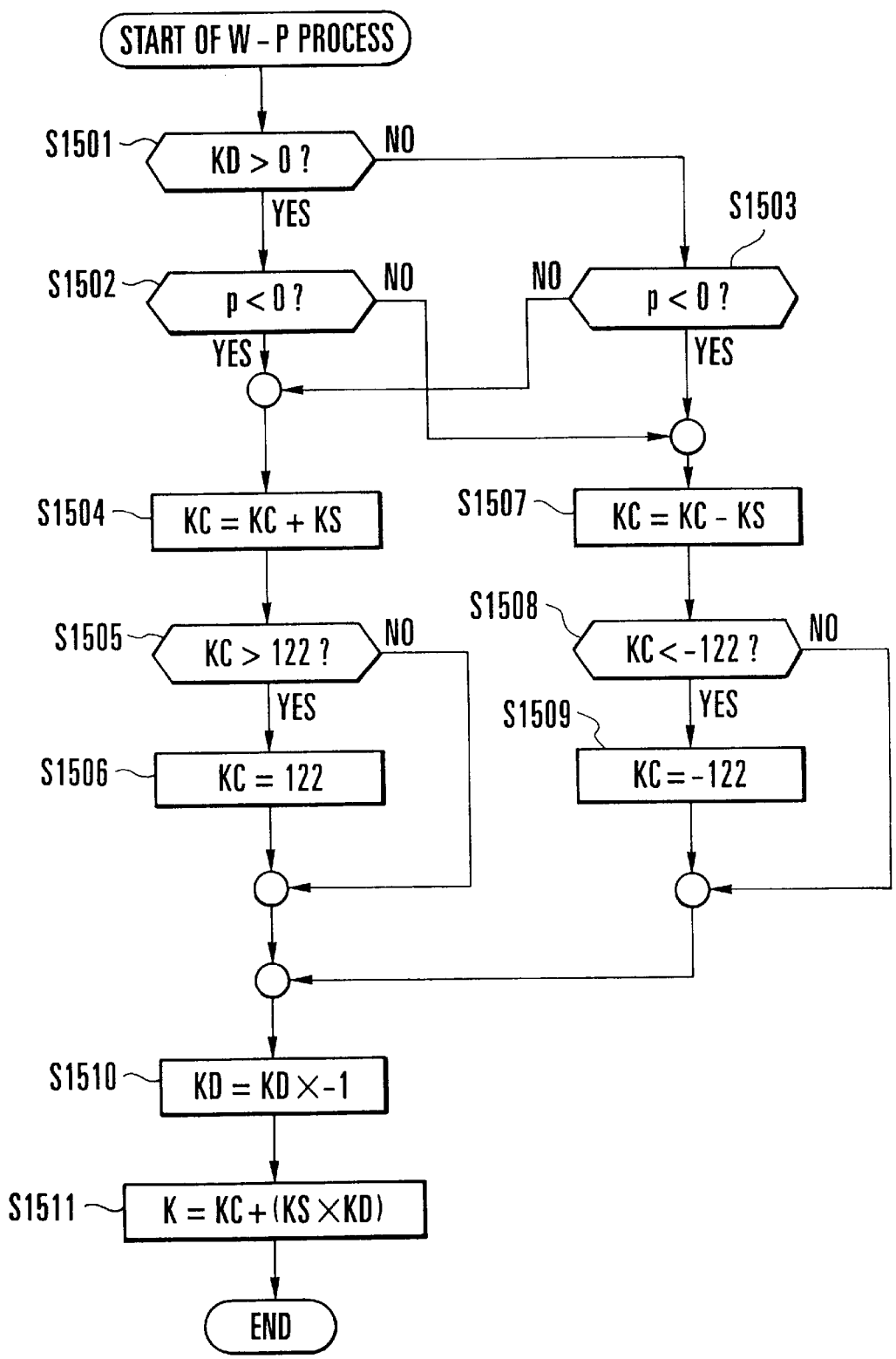
FIG. 28 is a flow chart showing the flow of a W-P process of the second embodiment of this invention.

FIG. 28 is a flow chart showing the W-P process. The W-P process is described as follows. At a step S1501 after the start of the W-P process, a check is made to find if the variable KD is of a positive value. If so, the flow comes to a step S1502. If it is found to be of a negative value, the flow comes to a step S1503.

At the step S1502, a check is made to find if the variable p is of a negative value. If so, the flow comes to a step S1504 to update the variable KC by adding the value of the variable KS to the variable KC, and then the flow comes to a step S1505. If the variable p is found to be of a positive value by the step S1502, the flow comes to a step S1507. At the step S1505, a check is made to find if the value of the variable KC is larger than 122. If not, the flow comes to a step S1510. If so, the flow comes to a step S1506 to set the variable KC at 122, and the flow then comes to the step S1510.

With the variable KD found by the step S1501 to be of a negative value, the flow comes to the step S1503. At the step S1503, a check is made to find if the variable p is of a negative value. If so, the flow comes to the step S1507. At the step S1507, the value of the variable KS is subtracted from the variable KC to update the variable KC, and then the flow comes to a step S1508. If the variable p is found to be of a positive value by the step S1503, the flow comes to the step S1504 to execute the processes of the steps described above.

At the step S1508, a check is made to find if the value of the variable KC is smaller than −122. If not, the flow comes to the step S1510. If so, the flow comes to a step S1509 to set the variable KC at −122, and then the flow comes to the step S1510.

At the step S1510, the sign of the value of the variable KD is inverted. At a step S1511, a result of arithmetic operation KC+(KS×KD) is substituted for the control coefficient K, and the W-P process comes to an end. In the W-P process, the variable KC which is a center value of the wobbling mentioned in the foregoing is updated on the basis of the variables KD and p.

FIG. 31 is a truth table showing the truth values of the W-P process.

As mentioned in the foregoing, the variable KD indicates the direction in which the wobbling is performed. The variable KS indicates the size of the wobbling. The control coefficient K is inverted at an amplitude of 2 KS for every sample.

In the case of the second embodiment, the value of the variable KC is limited to integers of 8 bits which have signs within a range of ±122.

In the A mode, as described above, the W-P process is executed for every individual track. The wobbling is performed in a cycle of two tracks. A speed at which the frequency characteristic control coefficient K is controlled in the direction of reducing errors is higher in the second embodiment than in the case of the first embodiment described in the foregoing.

Figure 29:
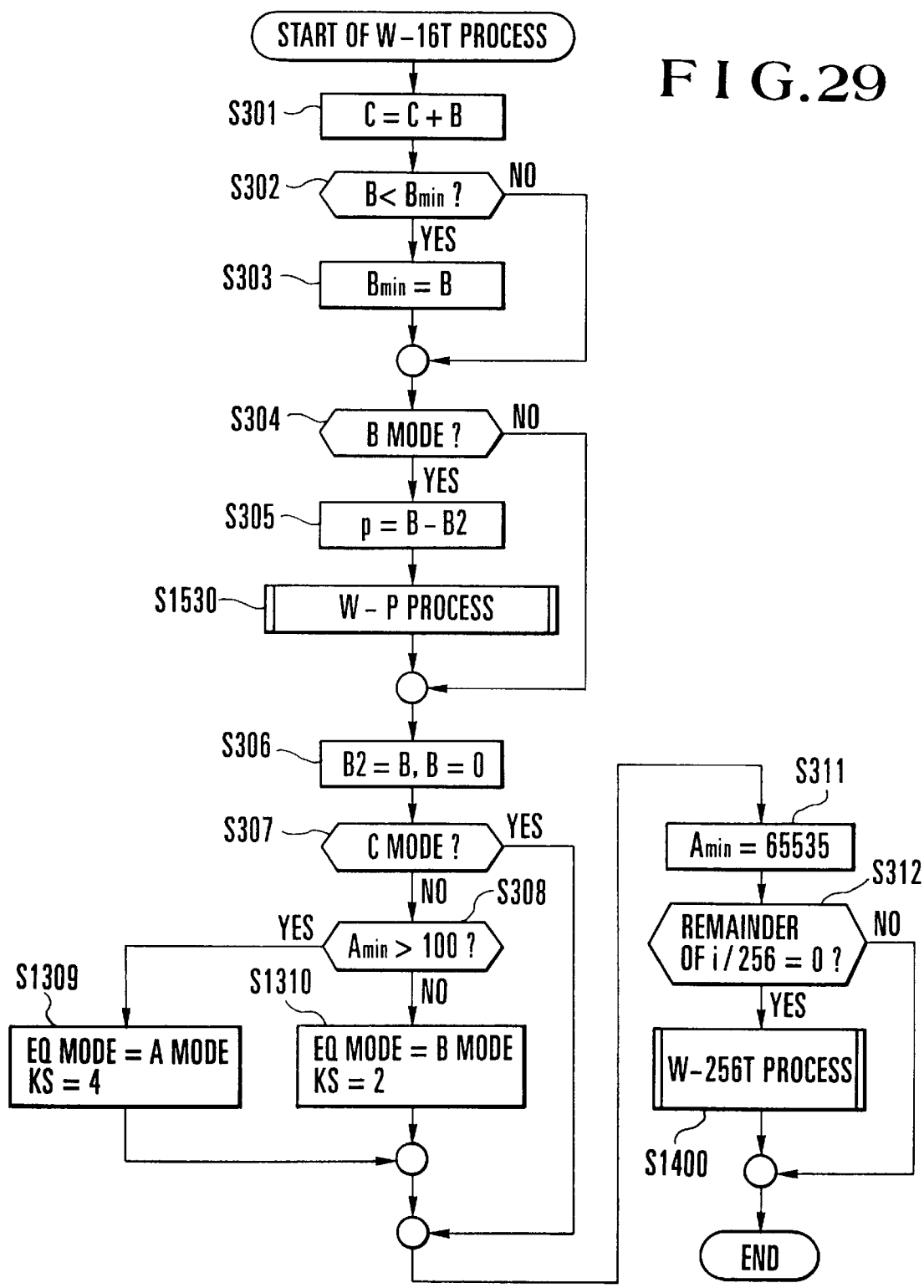
FIG. 29 is a flow chart showing the flow of a W-16T process of the second embodiment of this invention.

Referring now to FIG. 29, the W-16T process is described as follows. The W-16T process is similar to the 16T process of FIG. 23 but differs from the latter in four points including steps S1309, S1310, the W-P process of a step S1530 and the W-256T process of a step S1400.

At the step S1309, 4 is substituted for the variable KS at the same time that the EQ mode is set in the A mode. As a result, in the case of the A mode, the amplitude of the wobbling becomes 8 to permit a faster response speed. At the step S1310, 2 is substituted for the variable KS at the same time that the EQ mode is set in the B mode. The W-P process of the step S1530 is executed for every 16 tracks in a case where the EQ mode is the B mode. In other words, by handling a total of number-of-errors information for 16 tracks as one sample, the hill climbing control is performed for optimizing the control coefficient K while performing wobbling at an amplitude of 4 and in a cycle of 32 tracks.

Figure 30:
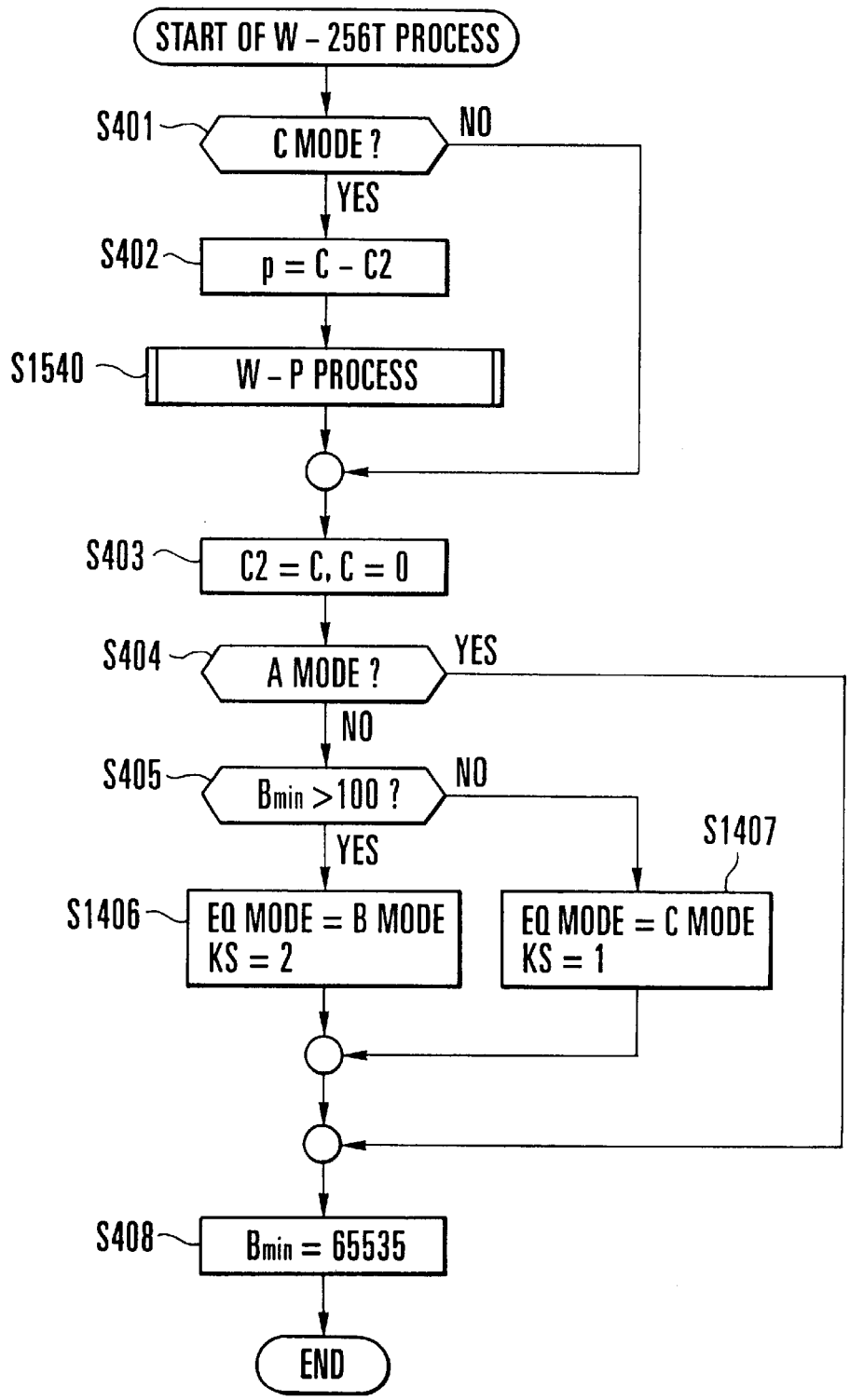
FIG. 30 is a flow chart showing the flow of a W-256T process of the second embodiment of this invention.

The W-256T process is described with reference to FIG. 30 as follows. The W-256T process is similar to the 256T process described in the foregoing but differs in three points including steps S1406 and S1407 and the W-P process of a step S1540.

At the step S1406, 2 is substituted for the variable KS at the same time that the EQ mode is set in the B mode. At the step S1407, 1 is substituted for the variable KS at the same time that the EQ mode is set in the C mode.

The W-P process of the step 1540 is executed for every 256 tracks when the EQ mode is the C mode. In the W-P process, a total of number-of-errors information for 256 tracks is handled as one sample, and wobbling is performed at an amplitude of 2 and in a cycle of 512 tracks.

As described above, in the second embodiment, the EQ mode includes three modes, i.e., A, B and C modes, and one of these modes is changed over to another according to the number of errors per unit time in such a way as to be capable of adequately carrying out the hill climbing control at a wobbling period and a wobbling amplitude apposite to the state of errors.

The arrangement enables the embodiment, under a bad error condition, to more quickly optimize the control coefficient K than in the case of the first embodiment and to stably carry out the automatic equalizing process.

In each of the embodiments described, an equalizing circuit which is capable of controlling the frequency characteristic of a reproduced signal is arranged in addition to an ordinary equalizing circuit. The automatic equalization is carried out by controlling the characteristic of the equalizing circuit. However, this invention is not limited to the arrangement of the embodiment described. In accordance with this invention, the arrangement of course may be changed in any manner as desired as long as the frequency characteristic of the reproduced signal can be controlled according to the state of the number of errors.

The conceivable methods for controlling the frequency characteristic of the reproduced signal include a method wherein, for example, a head amplifier having a controllable resonance characteristic is arranged and the frequency characteristic of the reproduced signal is controlled by controlling the resonance characteristic of the head amplifier according to the state of errors.

Further, since phase deviation of the reproduced signal have a great influence over the errors of the reproduced signal in detecting data from the reproduced signal by using a partial response technique, the embodiment is arranged to improve the state of errors by controlling the phase of a clock signal obtained from the reproduced signal. This invention thus applies also to the control over the phase of the clock signal, in addition to the control over the frequency characteristic of the reproduced signal.

While this invention is applied to a digital VTR in the case of each of the embodiments described, this invention applies to any other apparatus arranged to control the reproduced signal equalizing characteristic.

As apparent from the foregoing description, in equalizing the reproduced signal by equalizing means of a controllable equalizing characteristic, the equalizing characteristic can be changed at such timing that is apposite to the state of errors by changing the intervals of control over the equalizing characteristic according to the errors included in the reproduced signal.

Therefore, the equalizing characteristic can be quickly optimized, for example, by shortening the intervals of the control action when there are many errors, and the equalizing process can be stably carried out by making the intervals of the control action longer when there are not many errors.

Each of the embodiments described uses an equalizer of a variable equalizing characteristic and is arranged to decide, in equalizing the reproduced signal, whether or not the equalizing characteristic is to be changed on the basis of the reproduced signal.

In other words, the frequency (period) of the equalizing characteristic varying action is controlled according to the rate of errors in the reproduced signal. If there are many errors, the frequency of the equalizing characteristic varying action can be changed to quickly optimize the equalizing characteristic. If there are not many errors, the equalization can be stably carried out.

Further, according to this invention, the equalizing characteristic is changed while the level of the reproduced signal is in the neighborhood of a predetermined level which is, for example, 50% of a maximum level. Therefore, the equalizing characteristic can be changed to be most apposite to such a signal that is most vulnerable to an adverse effect of changes taking place in the equalizing characteristic.

What is claimed is:

1. A reproducing apparatus comprising:
   a) error detecting means for detecting errors included in a reproduced signal and outputting error detection signals;
   b) equalizing means for equalizing the reproduced signal, said equalizing means varying an equalizing characteristic thereof according to the error detection signals output from said error detecting means; and c) control means for deciding the number of times of executions of the operation of varying the equalizing characteristic per unit of time according to a state of errors included in the reproduced signal, said equalizing means varying the equalizing characteristic according to the decided result of said control means.

2. An apparatus according to claim 1, wherein said control means is arranged to increase said number when an error rate in the reproduced signal is high and to decrease said number when an error rate in the reproduced signal is low.

3. An apparatus according to claim 1, wherein said equalizing means is arranged to vary the equalizing characteristic by using a hill climbing control method.

4. An apparatus according to claim 1, wherein said control means controls said equalizing means to vary the equalizing characteristic by a predetermined amount for every predetermined period alternately in opposite directions.

5. An apparatus according to claim 1, wherein said error detecting means is arranged to detect random errors included in the reproduced signal, and wherein said equalizing means controls the equalizing characteristic according to the probability of the random errors included in the reproduced signal.

6. An apparatus according to claim 5, wherein said error detecting means is arranged to count the number of errors included in the reproduced signal per predetermined period of time when the level of the reproduced signal is higher than a predetermined level and to output a result of the counting to said control means.

7. A reproducing apparatus comprising:

a) error detecting means for detecting errors included in a reproduced signal;

b) equalizing means for equalizing the reproduced signal, said equalizing means varying an equalizing characteristic thereof according to an output of said error detecting means;

c) level detecting means for detecting the level of the reproduced signal and comparing the detected level with a predetermined level, said level detecting means being arranged to detect whether the level of the reproduced signal is between a first level and a second level lower than the first level; and d) control means for deciding, according to an output of said level detecting means, a period of time for which a varying action is to be performed on the equalizing characteristic of said equalizing means, said control means being arranged to decide a period during which the level of the reproduced signal is between the first level and the second level to be the period of time for which the equalizing characteristic is to be varied and to decide a period during which the level of the reproduced signal is not between the first level and the second level to be a period of time for which the equalizing characteristic is not to be varied.

8. An apparatus according to claim 7, wherein said control means is arranged to decide a period during which the level of the reproduced signal is higher than a predetermined level to be the period of time for which the equalizing characteristic is to be varied and to decide a period during which the level of the reproduced signal is lower than the predetermined level to be a perid of time for which the equalizing characteristic is not to be varied.

9. An apparatus according to claim 7, wherein the first level and the second level are levels in the neighborhood of 50% of a maximum level of the reproduced signal.

10. A reproducing apparatus comprising:

a) equalizing means for equalizing a reproduced signal;

b) error detecting means for detecting errors included in the reproduced signal equalized by said equalizing means and generating error detection signals indicating the detected errors; and c) control means for accumulating the error detection signals for a predetermined period of time and varying an equalizing characteristic of said equalizing means on the basis of a result of the accumulation, said control means varying the predetermined period of time for the accumulation according to a state of errors included in the reproduced signal.

11. An apparatus according to claim 10, wherein said control means is arranged to shorten the predetermined period of time for the accumulation when the number of errors included in the reproduced signal during the predetermined period of time is larger than a predetermined number and to lengthen the predetermined period of time for the accumulation when the number of errors included in the reproduced signal during the predetermined period of time is smaller than the predetermined number.

12. An apparatus according to claim 10, wherein said equalizing means is arranged to vary a frequency characteristic of the reproduced signal.

13. A reproducing apparatus comprising:

a) detecting means for detecting an error rate of a reproduced signal;

b) frequency characteristic control means for controlling a frequency characteristic of the reproduced signal, said control means varying a control characteristic thereof according to the error rate of the reproduced signal detected by said detecting means; and c) means for varying, according to a state of the errors included in the reproduced signal, a response speed of the control characteristic relative to a change of the error rate of the reproduced signal.

14. A reproducing apparatus comprising:

a) reproducing means for reproducing a signal;

b) equalizing means for equalizing the reproduced signal;

c) error detecting means for detecting errors in the reproduced signal equalized by said equalizing means to generate error flags;

d) dropout signal generation means for generating a dropout signal; and e) control means for controlling an equalizing characteristic of said equalizing means, said control means comprising a counter for receiving the error flags generated by said error detecting means to count the error flags, the counter counting the error flags in a period other than a period indicated in said dropout signal, said control means controlling the equalizing characteristic on the basis of the counting result of the counter in a predetermined period.

15. An apparatus according to claim 13, wherein said detecting means includes error correction means for correcting errors included in the reproduced signal by using an error correction code and detecting the errors which cannot be corrected by the error correction operation.

16. An apparatus according to claim 13, wherein the reproduced signal includes a digital signal.

17. An apparatus according to claim 13, wherein said control means makes the response speed quicker as the error rate becomes higher.

18. An apparatus according to claim 13, wherein said control means makes the response speed slower as the error rate becomes lower.

19. A reproducing method comprising:
   a) detecting an error rate of a reproduced signal;
   b) controlling a frequency characteristic of the reproduced signal, said controlling including varying a control characteristic thereof according to the detected error rate of the reproduced signal; and
   c) varying, according to a state of the errors included in the reproduced signal, a response speed of the control characteristic relative to a change of the reproduced signal.

20. The method according to claim 19, wherein said detecting includes correcting errors included in the reproduced signal by using an error correction code and detecting the errors which cannot be corrected by the error correction operation.

21. The method according to claim 19, wherein the reproduced signal includes a digital signal.

22. The method according to claim 19, wherein said controlling includes making the response speed quicker as the error rate becomes higher.

23. The method according to claim 19, wherein said controlling includes making the response speed slower as the error rate becomes lower.

* * * * *

UNITED STATES PATENT AND TRADEMARK OFFICE
CERTIFICATE OF CORRECTION

PATENT NO. : 5,835,666
DATED : November 10, 1998
INVENTOR(S) : Makoto Gohda, et al It is certified that error appears in the above-identified patent and that said Letters Patent is hereby corrected as shown below:

Col. 13, line 9, delete "+126" and insert --± 126--.
Col. 19, line 63, delete "perid" and insert --period--.

Signed and Sealed this

Seventeenth Day of August, 1999

Attest:

Q. TODD DICKINSON

Attesting Officer

Acting Commissioner of Patents and Trademarks